United States Patent
Mackenzie-Smith

(10) Patent No.: US 10,356,042 B1
(45) Date of Patent: Jul. 16, 2019

(54) AUTOMATED CONTACTS BOOK

(71) Applicant: Roderick Mackenzie-Smith, Hong Kong (HK)

(72) Inventor: Roderick Mackenzie-Smith, Hong Kong (HK)

( * ) Notice: Subject to any disclaimer, the term of this patent is extended or adjusted under 35 U.S.C. 154(b) by 0 days.

(21) Appl. No.: 15/974,723

(22) Filed: May 9, 2018

(51) Int. Cl.
*H04L 29/12* (2006.01)
*H04M 1/2745* (2006.01)

(52) U.S. Cl.
CPC .. *H04L 61/1594* (2013.01); *H04M 1/274508* (2013.01); *H04M 1/274533* (2013.01)

(58) Field of Classification Search
CPC ... H04L 67/306; H04L 67/22; H04L 67/1095; H04L 51/32; H04L 61/308; H04L 67/24; H04L 63/0227; H04L 63/102; H04L 67/141; H04L 51/14; G06F 17/30867; G06F 17/30286; H04W 4/21; G06Q 50/01
See application file for complete search history.

(56) References Cited

U.S. PATENT DOCUMENTS

| | | | | |
|---|---|---|---|---|
| 2009/0163183 | A1* | 6/2009 | O'Donoghue | G06Q 30/02 455/414.1 |
| 2014/0254434 | A1* | 9/2014 | Jain | H04L 67/306 370/259 |
| 2018/0232714 | A1* | 8/2018 | Wurmfeld | G06Q 20/1085 |

* cited by examiner

Primary Examiner — Nizar N Sivji

(57) ABSTRACT

A system, method or computer program product for providing automated contacts books can include an automated contacts book application and a contact details server. The automated contacts book application can run on a computer or mobile computing device and can be configured to interface with the contact details server so that users of the automated contacts book can search for and connect with other users within the contact details server. The automated contacts book can be further configured to permit each user remotely to populate, update and manage availability of their contact details in the automated contacts book applications of all the other users with whom the user is connected within the contact details server. The automated contacts book application can be further configured to interface with the communications systems of the computing devices on which it runs so as to use the up-to-date contact details to send communications.

9 Claims, 22 Drawing Sheets

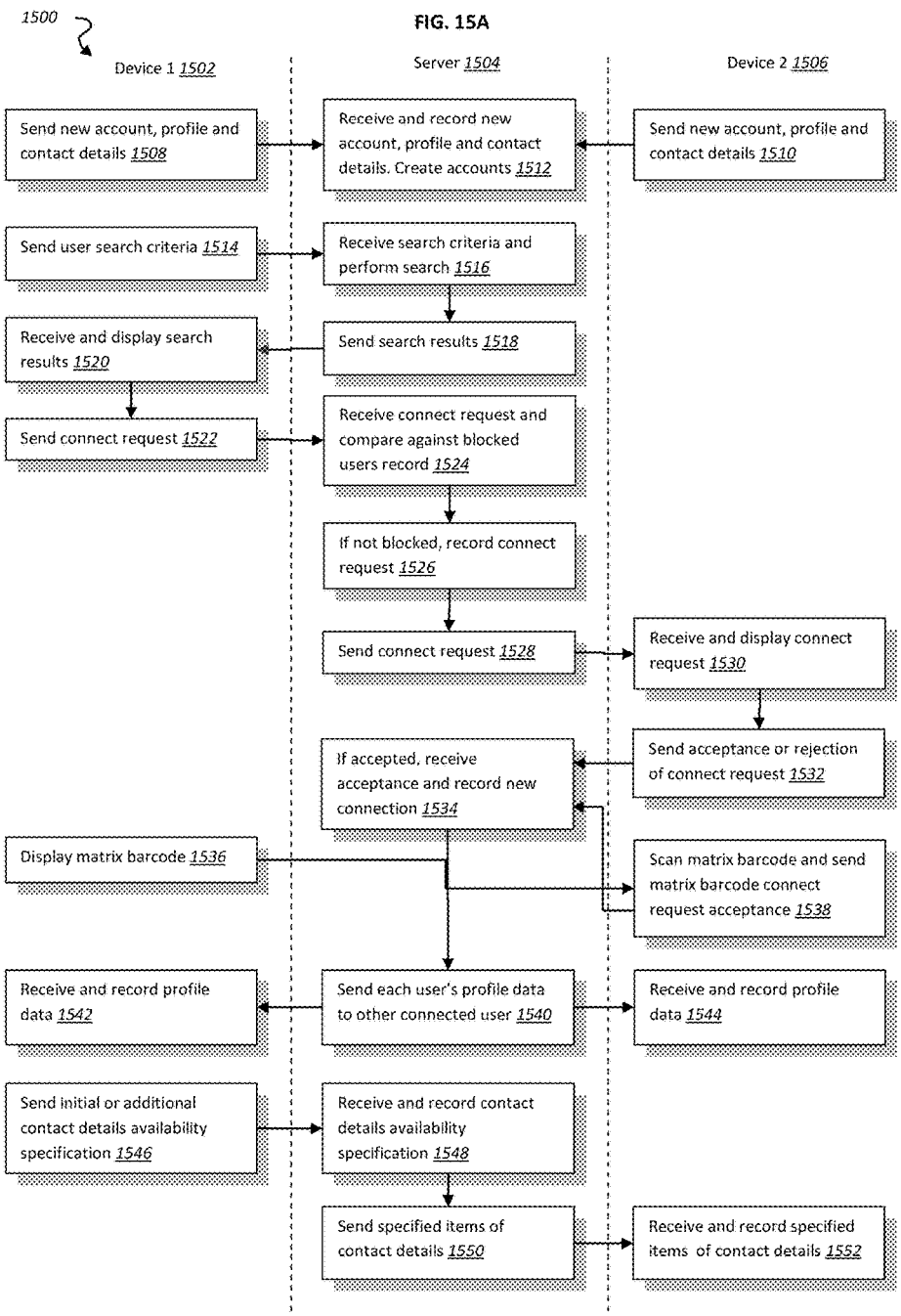

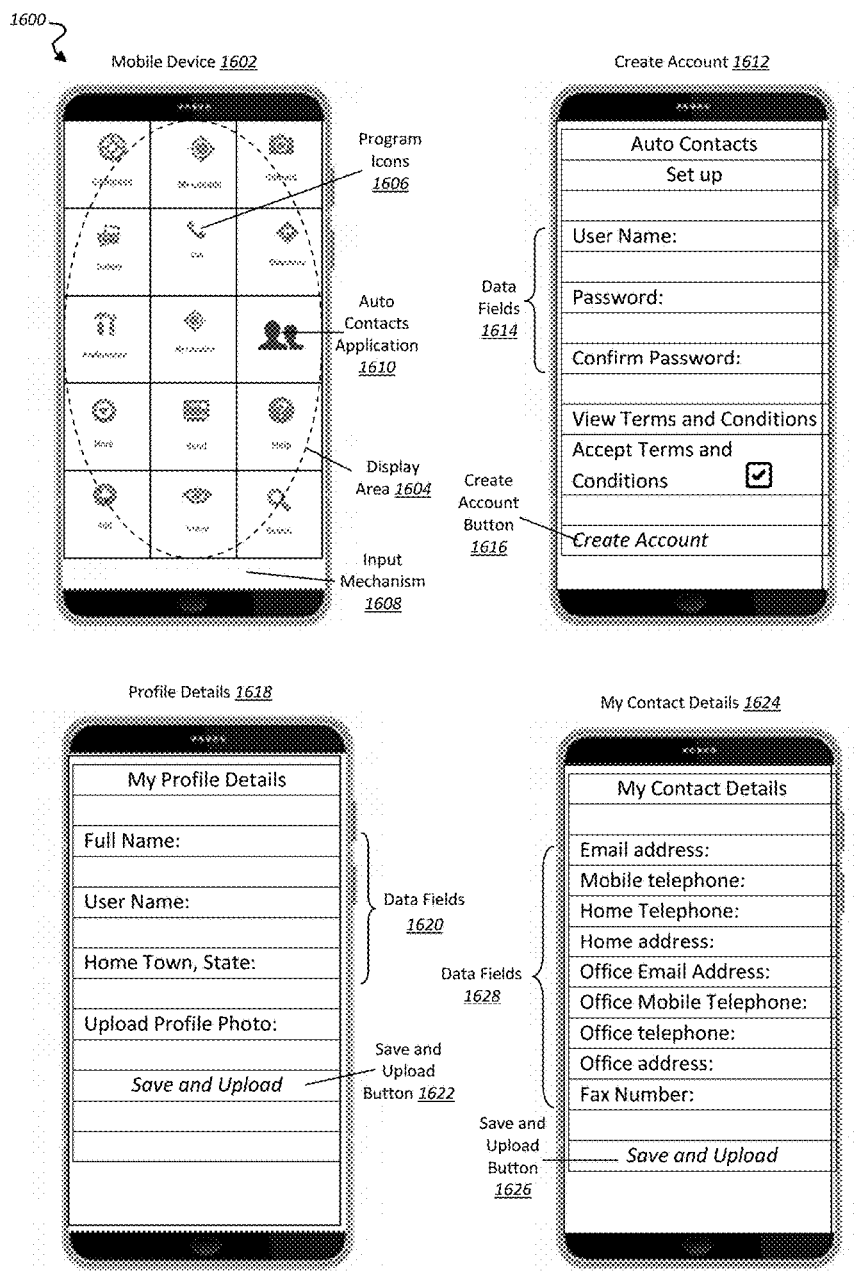

FIG: 19

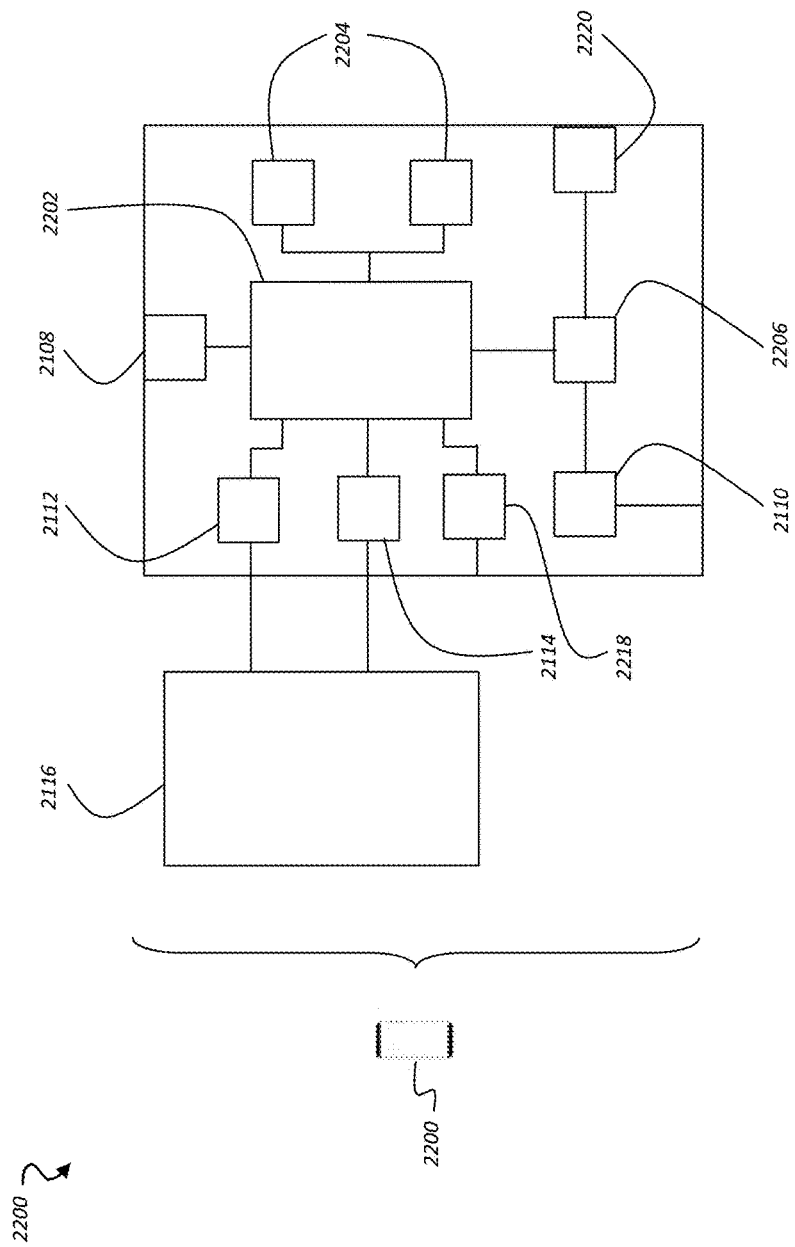

AUTOMATED CONTACTS BOOK

BACKGROUND

The present invention relates to the field of contacts books and in particular contacts book applications for computers and mobile computing devices such as smartphones and tablets.

Under the prior art, contacts book applications can be installed and run on computers and mobile computing devices. Such contacts book applications can be standalone applications whereby each user must populate, update and manage the content of their own contacts book application manually, generally by typing into their computer or mobile computing device all of the contact details and updates themselves. Alternatively, contacts book applications can be connected to a server whereby the user must still populate, update and manage their own contacts book manually, but the server can store a backup of the contacts book application and allow the user to download the contents of the contacts book application onto alternative computers or mobile computing devices.

As an alternative to manually typing contact details into their computers or mobile computing devices, users of contacts book applications may transmit contact details to other users in the form of virtual contact files. Virtual contact files can be transmitted, for example, as attachments to emails or instant messaging messages. However, virtual contact files require multiple actions by the recipient, who must manually open the associated email or instant message, open and review the virtual contact file and save the file into their contacts book application and then delete any obsolete contact details which it replaces. Virtual contacts files can also be shared by displaying and scanning matrix barcodes. While this procedure is simple, it generally requires users to be in the same place for the scanning to occur and does not permit users to control which of their contact details are shared by scanning the code.

Server systems can be used to automatically generate contacts lists by processing data from social networks, email and other databases. Under these systems, where a certain level of prior association between individuals is ascertained, their names can be automatically added to each other's contacts lists. Such systems require prior social media, email or telephone interaction between parties in order for their names to be added to each others' contact lists. Such systems require significant amounts of users' private data to be provided for processing.

In order successfully to communicate with their contacts, under the prior art, users of contacts book applications must also request and rely upon their contacts to populate, update and manage the user's own contact details in their contacts books.

As further explained below, these processes are repetitive and inconvenient. They can also cause uncertainty, frustration, inaccuracy and loss of contact.

Under the prior art, every time a user of a contacts book application wishes to create a new contact entry, whether or not the contacts book application is connected to a server, they must type, every relevant detail of the new contact into their contacts book application. Alternatively they must request, receive, open, review and save a virtual contacts file into their contacts book application. Consequently, if a person has five hundred contacts, they will have entered and/or saved five hundred different sets of contact details into their contacts book application. Similarly, five hundred people will have entered and/or saved identical contact details of the user into their own contacts books applications. This procedure is inefficient and inconvenient.

Under the prior art, every time a user of a contacts book application changes their own contact details, whether or not the contacts book application is connected to a server, in order for the new contact details to appear in the contacts books of their contacts, they must send a request to all their contacts asking them to update their own contacts books with the user's new contact details. Again, it is necessary for the identical updating task to be performed by potentially hundreds of people. This procedure is inefficient and inconvenient. Given the frequency with which people change their contact details and the frustrating nature of the updating procedure, a person may decide not to send their new contact details to every person who has their old contact details, resulting in the remaining people retaining the out-of-date contact details. Certain recipients of the new details may simply fail to update their contacts book applications, resulting in their retaining the out-of-date contact details.

Under the prior art, it is not possible for a user of a contacts book application remotely to manage which items of their contact details are available to another person in that person's contacts book application, whether or not the contacts book application is connected to a server. For example, if an existing business contact becomes a personal friend, it is necessary to request that person to add further personal contact details to their contacts book application. Or, if a person no longer wishes some or all of their contact details to be available in another person's contacts book application, for example on leaving an employment, it is necessary for them to request that that person deletes their contact details from their contacts book application. These tasks are inconvenient and frustrating.

Under the prior art, if a user of a contacts book application wishes to change their contact details on a temporary basis, whether or not the contacts book application is connected to a server, they must manually send the temporary contact details to every contact with a message informing them of the of the period during which they will be in use. For example, this requirement would arise if a person were travelling outside their home country for a period of time and wished temporarily to use a local subscriber identity module (a SIM card) for a mobile computing device such as a smartphone. Given the disproportionate burden of asking hundreds of people to edit their records to reflect the temporary telephone number and then edit them back again at the end of the period, the traveller may decide not to use a local SIM card and instead to pay the more expensive international roaming charges associated with using their normal SIM card.

Under the prior art, if a person wishes permanently to change their email address, telephone number or other contact details, they may be disinclined to do so because of the risk of losing contact with people. Frequently, people retain the same telephone number or email address for many years despite the inconvenience this may cause in terms of inability to avail themselves of cheaper contract rates, better terms and conditions, more secure email servers and avoiding unsolicited telephone calls, spam emails and other undesirable communications. The control of personal data such as contact details and the inability to avoid unsolicited communications have become majors problem in recent times.

In summary, people and organisations spend considerable periods of time populating, updating and managing contacts books containing hundreds of people's contact details often with no absolute certainty as to whether a large proportion of them are, or are not, accurate. People retain the same contact details for years, feeling unable to regain control of the communications they receive by changing their contact details.

BRIEF SUMMARY

The present invention provides for a global directory of people and organisations comprising public profile data and private contact details data. The present invention enables users to compile personal automated contacts books from this global directory by searching for other users within the public profiles and connecting with them. The present invention allows users full control over each item of their contact details and the users to whom it is available. In one action, users can push new contact details into, or pull old contact details out of, the automated contacts books of any or all the users to whom they are connected.

The critical functions of a contacts book are ease and precision of compilation, currency and accuracy of data, control of data availability, flexibility of data use and privacy. The present invention is superior to the prior art in the following respects.

Compilation is precise and simple because only selected users are added to the automated contacts book and there is no need manually to enter or update other users' contact details. Contact details are current and accurate because they can be instantly updated at any time. Contact details data availability is controlled because each item of contact details data can be pushed into or pulled from each connected users' automated contacts book at any time. Contact details can be used flexibly because they are visible within the automated contacts book for reference purposes, for example, for dialling from a land line or addressing an envelope, as well as being usable directly to launch an email, telephone or other application. The present invention is private because it enables direct communication between parties without routing communications via the contact details server. Also, the present invention does not require sharing of prior social network, email, telephone or other personal data as a necessity of use.

The present invention enables users to share diverse forms of contact details data including telephone numbers, street addresses, email addresses and other contact details.

One aspect of the disclosure can include a system for providing automated contacts books. Such a system can include an automated contacts book application connected to a contact details server.

The automated contacts book application can be installed and run on a plurality of computers and/or mobile computing devices. The automated contacts book application can be configured to interface with the contact details server so as to enable the user (i) to search for and request connection with other users, and (ii) when so connected, remotely to populate, update and manage the availability of the user's contact details in the automated contacts book applications of all such connected users.

Likewise, the automated contacts book application can be configured to interface with the contact details server in the opposite direction so as to enable other users (i) to search for and request connection with the user, and (ii) when so connected, remotely to populate, update and manage the availability of such other users' contact details in the user's own automated contacts book application.

The automated contacts book application can be further configured, to interface with the communications systems of the user's computer or mobile computing device on which it runs so as to use the automatically populated and updated contact details to send communications, such as but not limited to, telephone calls, SMS messages and emails.

Effectively, the system can enable each user remotely to populate, update and manage their own page in the contacts books of all the other users with whom they are connected in the server without further consent or action by such other users. One edit by the user can be automatically and simultaneously repeated, potentially hundreds of times, within all the connected users' automated contacts book applications.

In this way, by each user simply entering and updating their own contact details, the system allows all users permanently to have up-to-date, accurate and instantly usable contact details for all their connected contacts and avoids the need for identical entries and edits to be made potentially hundreds of times.

Another aspect of the disclosure can include a method for providing automated contacts books. Such a method can begin with the user populating their profile data and contact details within the automated contacts book application on their computer or mobile computing device, followed by the transmission by the application of the profile data and contact details to the contact details server. The user can then cause the application to search for other users within the profile data stored within the contact details server and to request connection with users selected from the search results. Then, if such connection requests have been accepted by the other users, the contact details server can interface with the automated contacts book applications of the all the other users with whom the user is connected within the server to send the user's profile data and specified contact details to the automated contacts book applications of those other users.

Likewise, the method can work in the opposite direction whereby the contact details of the people to whom the user is connected within the contact details server are remotely populated, updated and managed within the automated contacts book application of the user. Effectively, the method can enable each user remotely to populate, update and manage their own page in the contacts books of all the other users with whom they are connected in the server, ensuring accuracy of contact details and avoiding the need for identical entries and edits to be made potentially hundreds of times.

Additionally, the method can include interfacing with the communications systems of the computer or mobile computing device on which the automated contacts book application runs so as to use automatically populated and updated contact details to send communications such, as but not limited to, telephone calls, SMS messages and emails.

Yet another aspect of the disclosure can include a computer program product that includes one or more computer-readable storage medium(s) having embedded computer-usable program code.

The computer-usable program code can be configured to record the user's profile data and contact details and changes in those details and to transmit them to a contact details server. The computer-usable program code can be further configured to allow the user to search within the profile data stored within the contact details server and to request connection with users selected from the search results. Then, if such connection requests have been accepted, further computer-usable program code embedded in the computer-readable storage medium of the contact details server can interface with the computer-usable program code embedded in the computer-readable storage medium of the computer or mobile computing devices of the people to whom the user is connected within the contact details server to populate or update the user's contact details within those users' automated contacts book applications.

Likewise, the computer-usable program code embedded in the computer-readable storage medium of the computer or mobile computing device can be configured to work in the opposite direction, so as to record the profile data and contact details and changes in those details of the people to whom the user is connected in the contact details server and to transmit them to the contact details server. Further computer-usable program code embedded in the computer-readable storage medium of the contact details server can then interface with the computer-usable program code embedded in the computer-readable storage medium of the computer or mobile computing device of the user to populate or update the connected users' contact details within the user's automated contacts book. Effectively, the computer program product can enable each user to populate, update and manage their own page in the contacts books of all the other users with whom they are connected in the server, ensuring accuracy of contact details and avoiding the need for identical entries and edits to be made potentially hundreds of times.

Additionally, the computer program product can be configured, via permissions, to interface with the communications systems of the computer or mobile computing device so as to use the automatically populated and updated contact details to send communications such, as but not limited to, telephone calls, SMS messages and emails.

BRIEF DESCRIPTION OF THE SEVERAL VIEWS OF THE DRAWINGS

FIGS. 16 through 20 are a collection of mobile computing device graphical user interfaces (GUIs) illustrating a sample implementation of an automated contacts book application in accordance with an embodiment of the inventive arrangements disclosed herein.

FIG. 22 shows an example of a generic mobile computer device.

DETAILED DESCRIPTION

Described herein is a system for providing automated contacts books. The system enables users to connect with other users and to populate, update and manage availability of their contact details within the automated contacts books of those other users.

Figure 1:
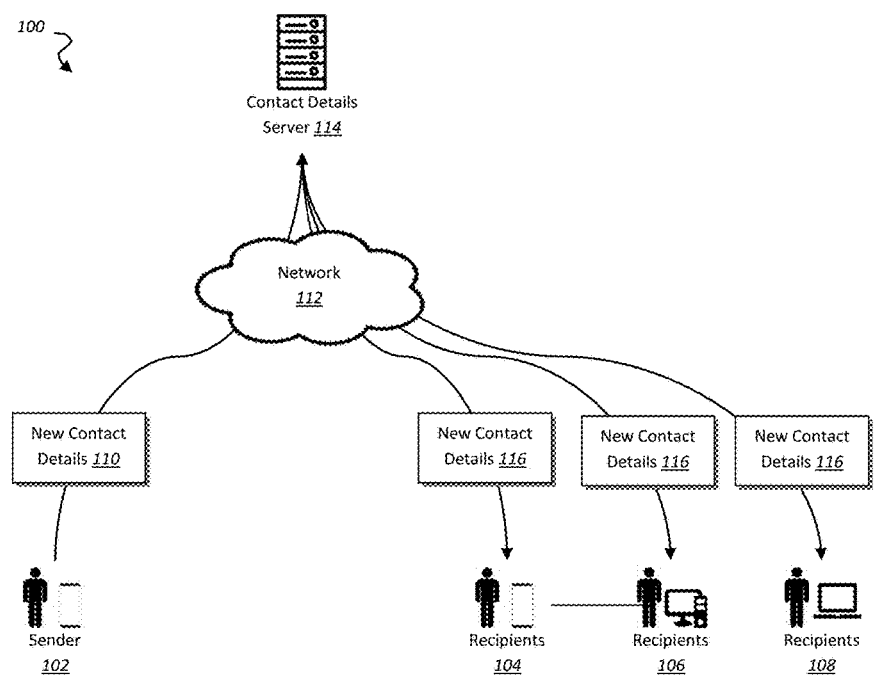
FIG. 1 is a block diagram that shows an example system for automated contacts books in accordance with embodiments of the inventive arrangements disclosed herein.

FIG. 1 is a block diagram that shows an example system for automated contacts books. Using the system 100, for example, a user 102 can automatically update their new telephone number 110 and 116 directly into their page in the automated contacts books of multiple other users 104, 106, 108 without requiring any action on the part of those other users. The system 100 can include one or more computer systems with which the user can complete the automated updating process. For example, the user can use a personal computer, a laptop, or a smartphone or other mobile computing device.

The terms user, sender and recipient when used in this document can represent the computing devices with which individuals (who are users, senders and recipients of contact details) can be connected to the network 112. In some cases, the use of the terms can also imply user, sender and recipient actions on those computer devices, such as the updating of contact details. In some cases, the use of the terms can also imply the accounts associated with such user, sender or recipient registered within the contact details server 114.

Users can install and run an automated contacts book application on their computer 102, 104, 106 and 108. Users can create an account within the automated contacts book system 100 and upload their profile details and their contact details, via the network 112, to a contact details server 114. The profile details can be publically searchable by other users. The contact details can be shared privately between users. Users can search the profile details of other users to locate the profile of another user with whom they wish to share contact details. Having found the other user's profile, they can send a connect requests to that other user. If the recipient accepts the connect request, they can become connected users with respect to each other and this connection can be recorded in the contact details server 114. The contact details server 114 can then add the profile details of each connected user to the other connected user's automated contacts book. Each connected user can then specify, separately or collectively, which individual items of their contact details are to be sent by the contact details server 114 to the automated contacts book of the other connected user. Using the system, connected users can at anytime (i) automatically populate their contact details into the automated contacts book of the other user, (ii) automatically update their contact details within the other user's automated contacts book and (iii) automatically manage availability of each item of their contact details within the other user's automated contacts book.

In some implementations of the present invention, users can simply specify that, as soon as another user accepts a connection request from the user, or vice versa, the contact details server 114 should automatically share all the user's contact details with that other user.

Users can access and update their own contact details within their own automated contacts book. Once saved, the updated contact details can be sent by the computing device to the contact details server 114. The contact details server 114 can then send the updated contact details to the automated contacts books of each connected user who the user has specified as having availability of the updated item of contact details. The updated contact details can be recorded in the memory of the computer or mobile computing device for reference and communication use. For example, if a user changes his business telephone number, he can update and save the record of his business telephone number in his automated contacts book and thereby cause the contact details server 114 to send his updated business telephone number to the automated contacts books of all the connected users who are recorded within the contact details server as having availability of his business telephone number. In this example, one update by the user can cause identical updates to be automatically and simultaneously reflected in potentially hundreds of other user's automated contacts books.

Users can view and alter the specification of the items of their contact details that are available to each other user with whom they are connected within the contact details server. For example, if a personal friend of a user becomes a business associate of the user, the user can alter the specification of the items of contact details that are available in the business associate's automated contacts book so as to include the user's business contact details.

As explained above, the system gives the user both wide control over editing their contact details in potentially hundreds of automated contacts books simultaneously and narrow control over availability of each item of contact details in each connected user's automated contacts book. In this way, users can retain full control over the content of their contact details, who has their contact details and which items of their contact details each person has.

In some implementations, a user's automated contacts book application and its contents may be transferred from one computing device to another computing device by installing the application on the new computing device and signing in to an existing account within the system during the set up process.

In some implementations users can connect their own servers to the contacts details server via an application programming interface within the contact details server.

In some implementations the automated contacts book application can request and be granted permission to access and interface with other contacts applications, features or services running on or associated with the operating system of the user's computer or mobile computing device. In these circumstances, the automated contacts book application could be permitted to add, edit and remove contact details within such contacts applications, features or services of the computing device.

In some implementations the automated contacts book application can request and be granted permission to access and interface with the communications features or services associated with or running on the operating system of the user's computer or mobile computing device. In these circumstances, the automated contacts book application could be permitted to interface with the email, telephone, messaging, camera and other features of the computing device.

FIGS. 2 through 14 collectively show an example system 200 and sequence of events for providing automated contacts books. FIGS. 2 through 14 also collectively show the system 200 as providing an example hardware flow and architecture for providing automated contacts books. For example, once configured, the system 200 can be used automatically to update a user's new telephone number directly into the user's page in the automated contacts books of hundreds of other users without requiring any action on the part of those other users.

Figure 2:
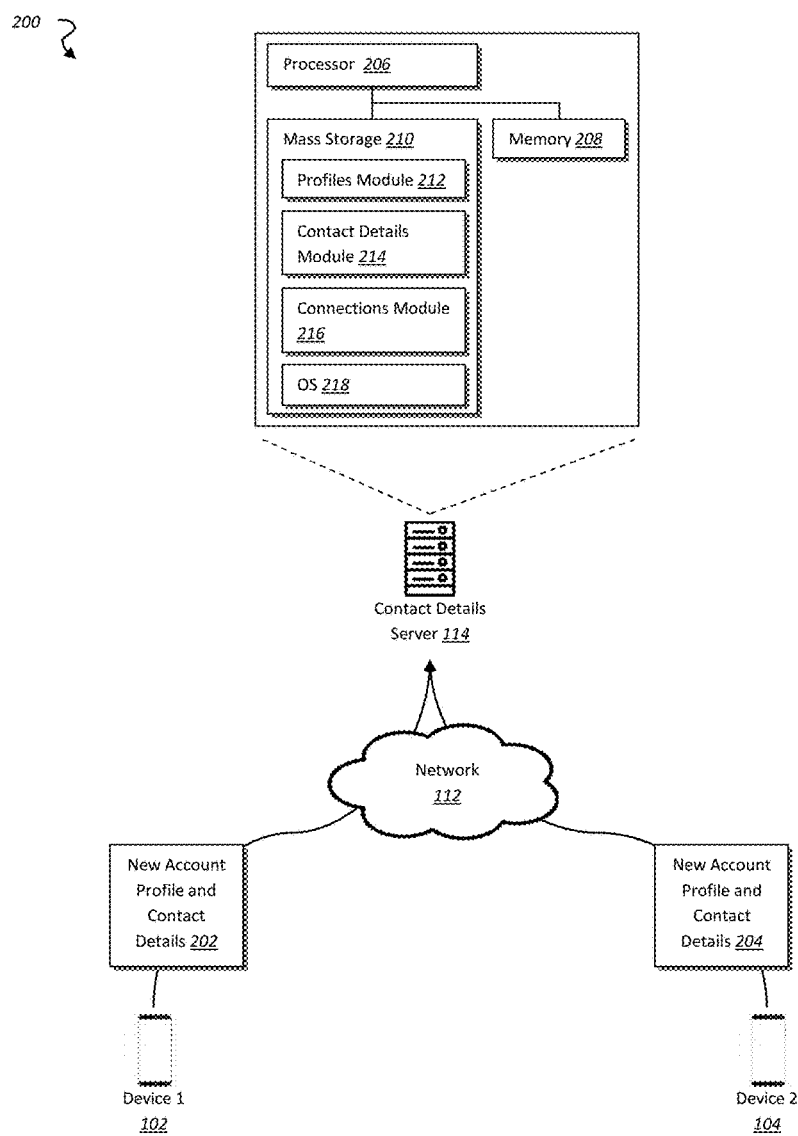
FIGS. 2 through 14 collectively show an example system and sequence of events for providing automated contacts books in accordance with embodiments of the inventive arrangements disclosed herein.
Figure 3:
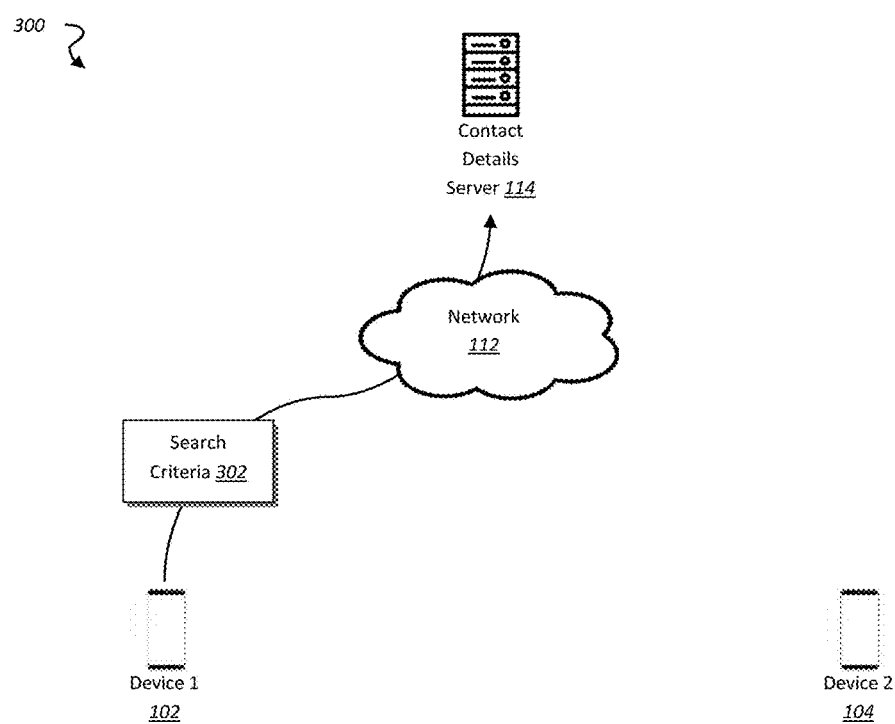
Figure 4:
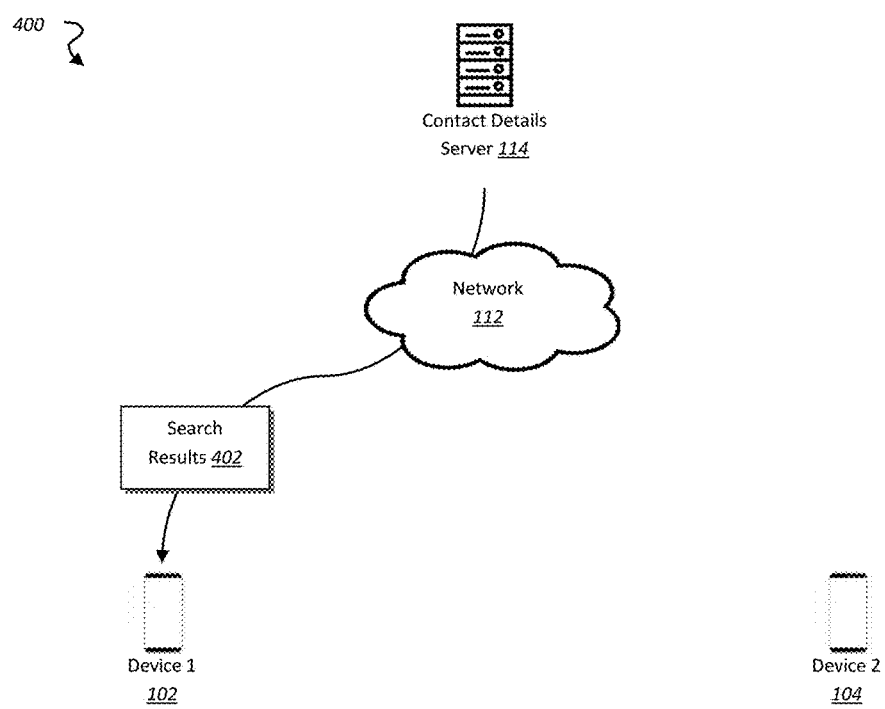
Figure 5:
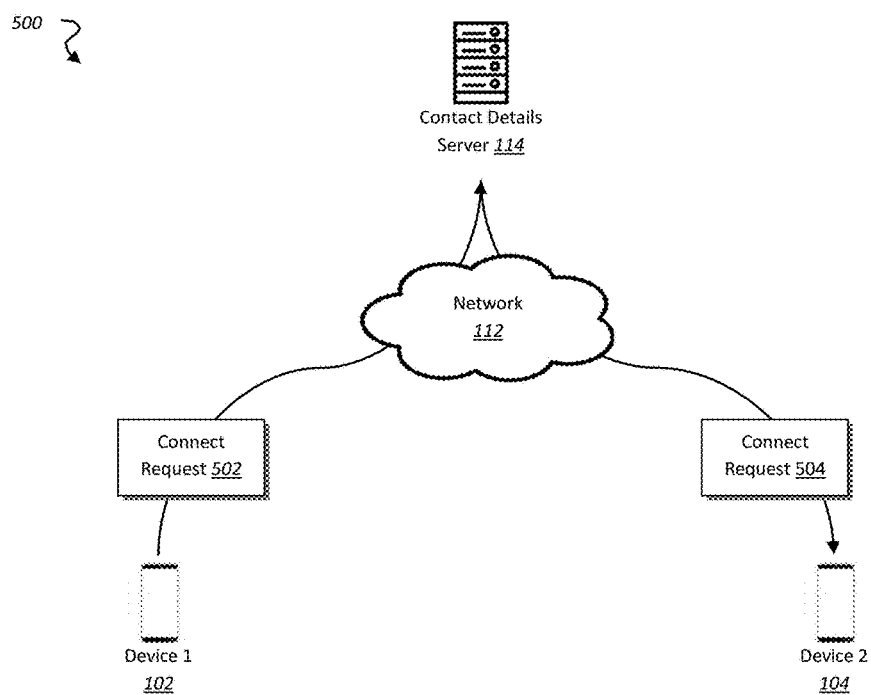
Figure 6:
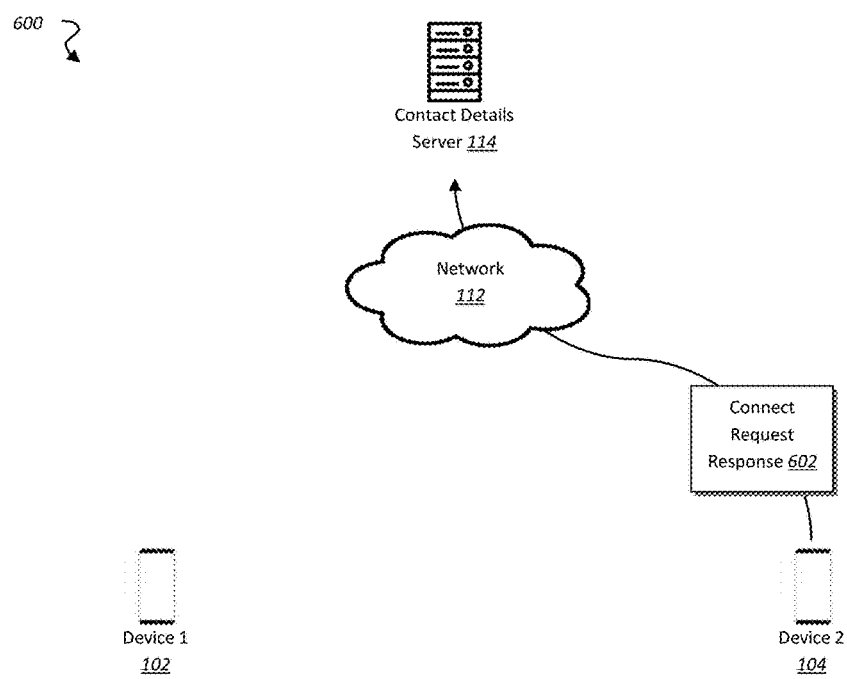
Figure 7:
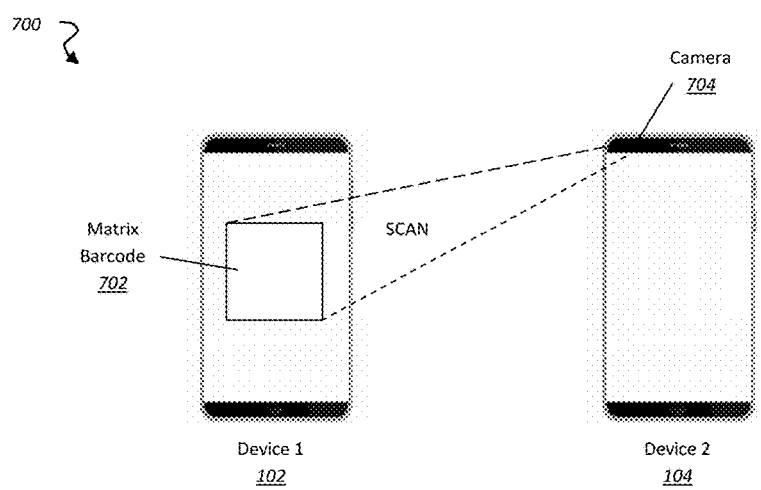
Figure 8:
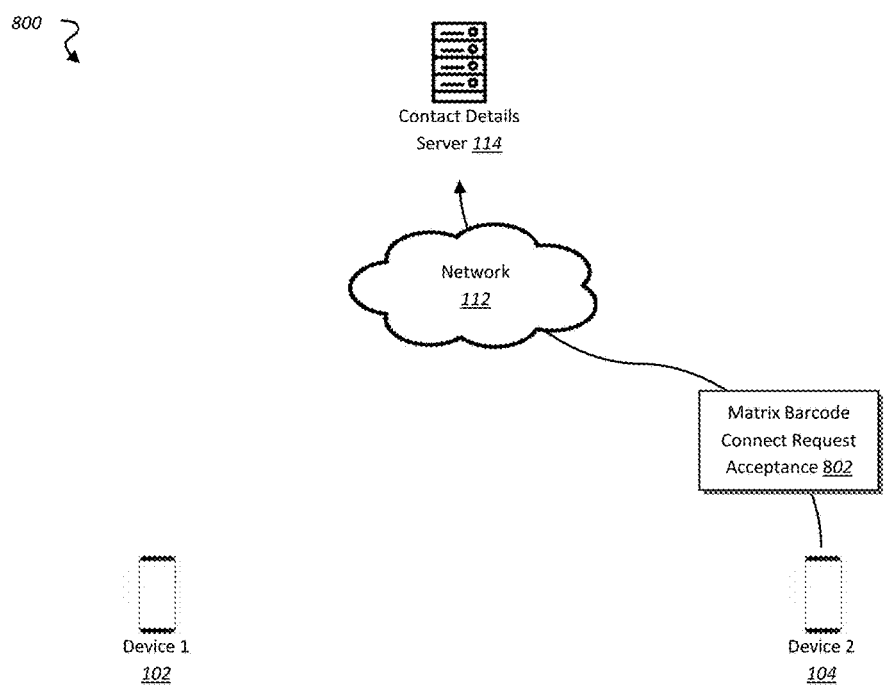
Figure 9:
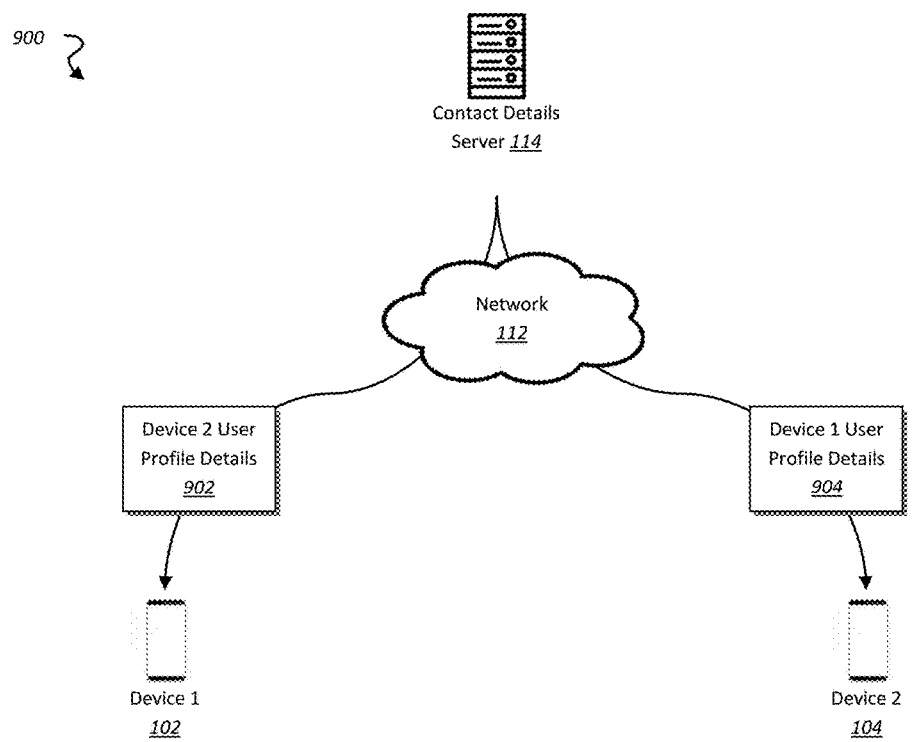
Figure 10:
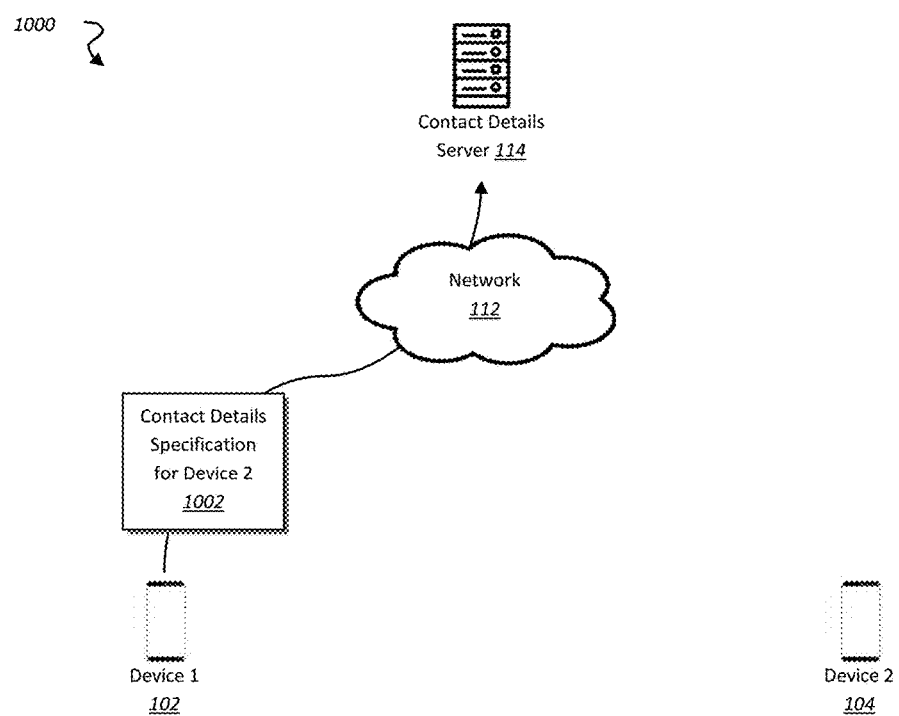
Figure 11:
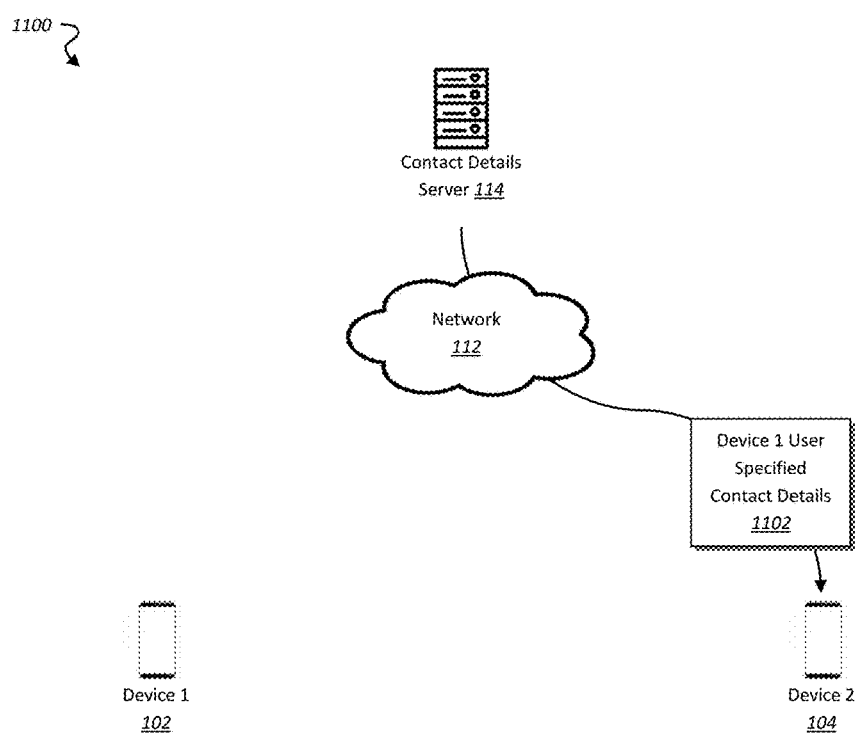
Figure 12:
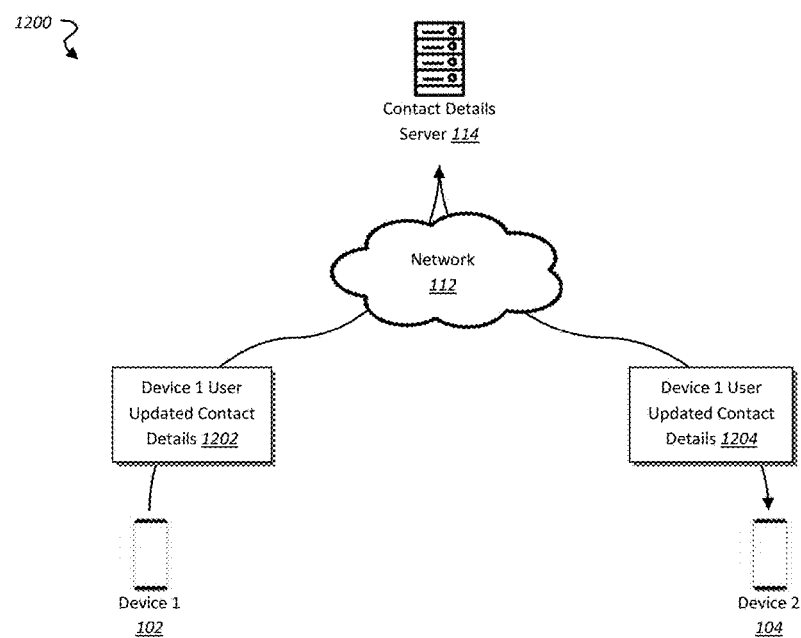
Figure 13:
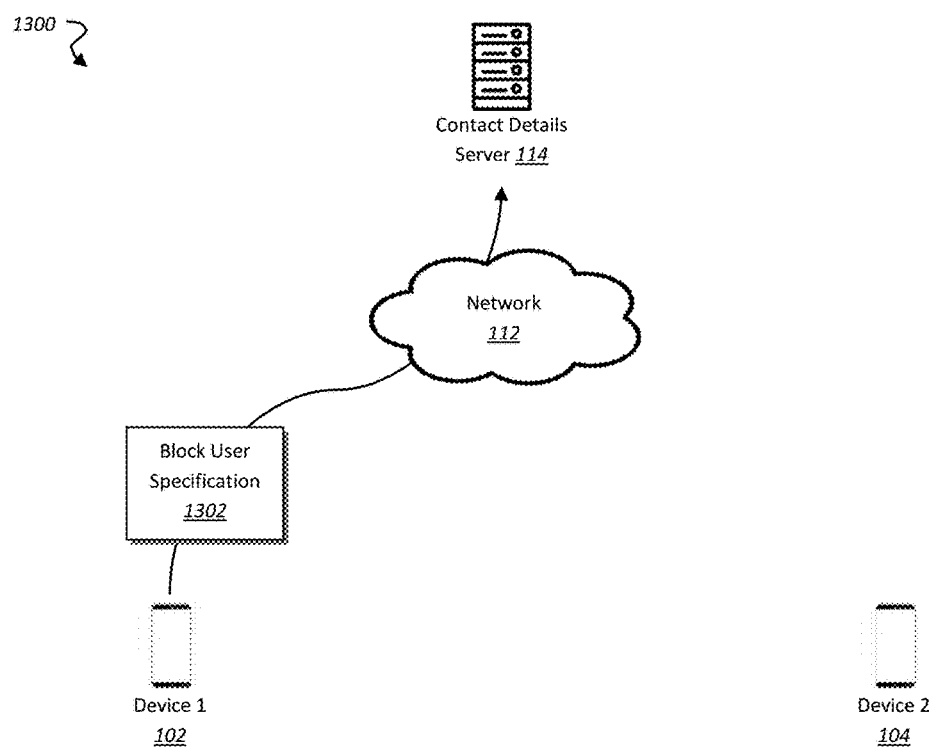
Figure 14:
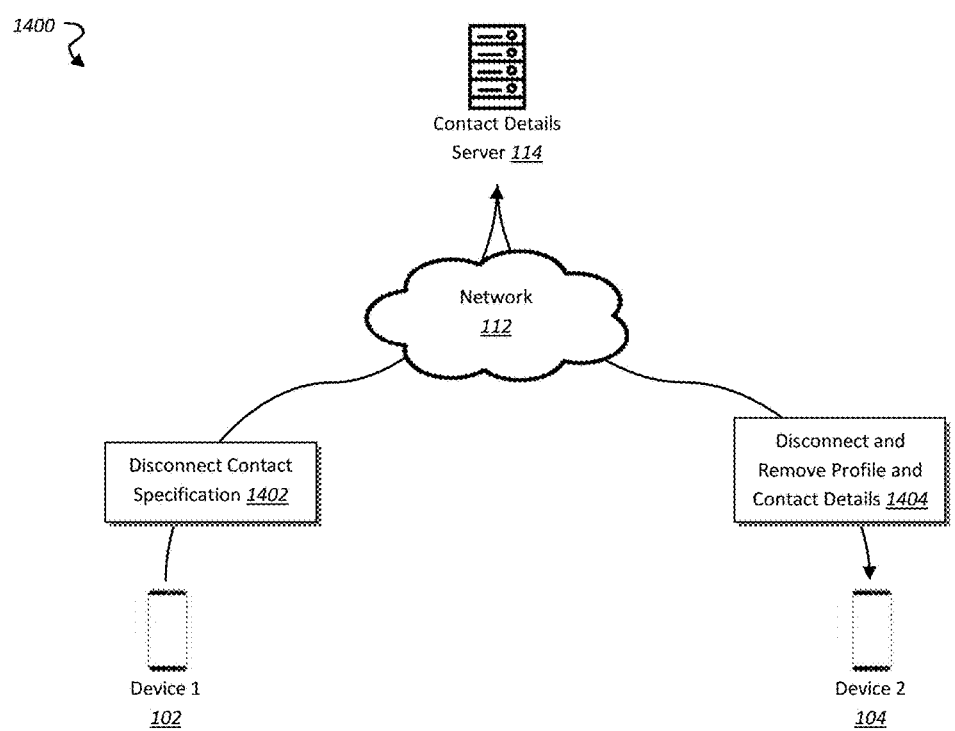

Referring to FIG. 2, the system 200 includes at least one contact details server 114 for serving contact details that have been uploaded by users. The network 112 can connect the contact details server 114 with any number of users' devices 102 and device 104.

For example, the action of device 102 submitting search criteria 302 to the contact details server 114 can be the first in a sequence of actions for providing automated contact details to another user's device 104. The remaining actions, for example, are shown in FIGS. 3 through 14.

For example, the contact details server 114 can operate as a data server for users such as device 102 and device 104. The users can interact with the server using the network 112. Users such as device 102 and device 104 can interact with the server 114, using the network 112, to download the automated contacts book application, install it on the mobile or other computing device, create an account within the contact details server, upload their profile details and their contact details 202 and 204 to the contact details server 114, to submit search criteria 302 to the contact details server 114, to receive search results 402 from the contact details server 114, to send connect requests 502 to the contact details server 114 and to receive and record connect requests 504 from the contact details server 114, to send connect request acceptance or rejection 602 to the contact details server 114, to display matrix barcode 702, to scan matrix barcode with camera 704, to send matrix barcode acceptance 802 to the contact details server 114, to receive and record profile details of connected users 902 and 904 from the contact details server 114, to send contact details availability specifications 1002 to the contact details server 114, to receive and record specified contact details 1102 from the contact details server 114, to send updated and or edited contact details 1202 to the contact details server 114 and to receive and record updated and or edited contact details 1204 from the contact details server 114, to send blocked user specification 1302 to the contact details server 114, and to send disconnect contact specification 1402 to the contact details server 114 and, when so specified, to remove profile and contact details from the relevant devices 1404.

Connect requests, profile details and contact details can be recorded in the memory of the computer or mobile computing device of the receiving user and made available within the automated contacts book application for reference and communication purposes.

In some implementations, the contact details server 114 includes a processor 206 communicatively coupled to memory 208 and a mass storage device 210. The processor 206 can process instructions (e.g., stored in the memory 208) for execution within the contact details server 114. The mass storage device 210 can store data and instructions for a contact details server 114 including a profiles module 212 for identifying users, a contact details module 214 for providing contact details to users, a connections module 216 for handling connections and contact details availability specifications between users, and an operating system 218 for executing applications on the contact details server 114.

The profiles module 212 of the contact details server 114, for example, can include applications that record and store profile details and serve profile details and search results to connected users' devices such as 102 and 104. For example, the profiles module 212 of the contact details server 114 can be the component of the contact details server 114 that primarily serves to identify users and provide search results and profile details to connected users' devices such as 102 and 104.

The contact details module 214 of the contact details server 114, for example, can include applications that record and store contact details and serve contact details 1102 and updated or edited contact details 1204 to connected users such as 102 and 104. For example, the contact details module 214 of the contact details server 114 can be the component of the contact details server 114 that primarily serves to provide contact details to connected users such as 102 and 104.

The connections module 216 of the contact details server 114, for example, can include applications that record and store connections, connect requests 502, blocked user specifications 1402 and contact details availability specifications 1002. The connections module 216 can interface with the contact details module 214 to handle populating, updating and managing specified contact details between users' devices.

Figure 15B:
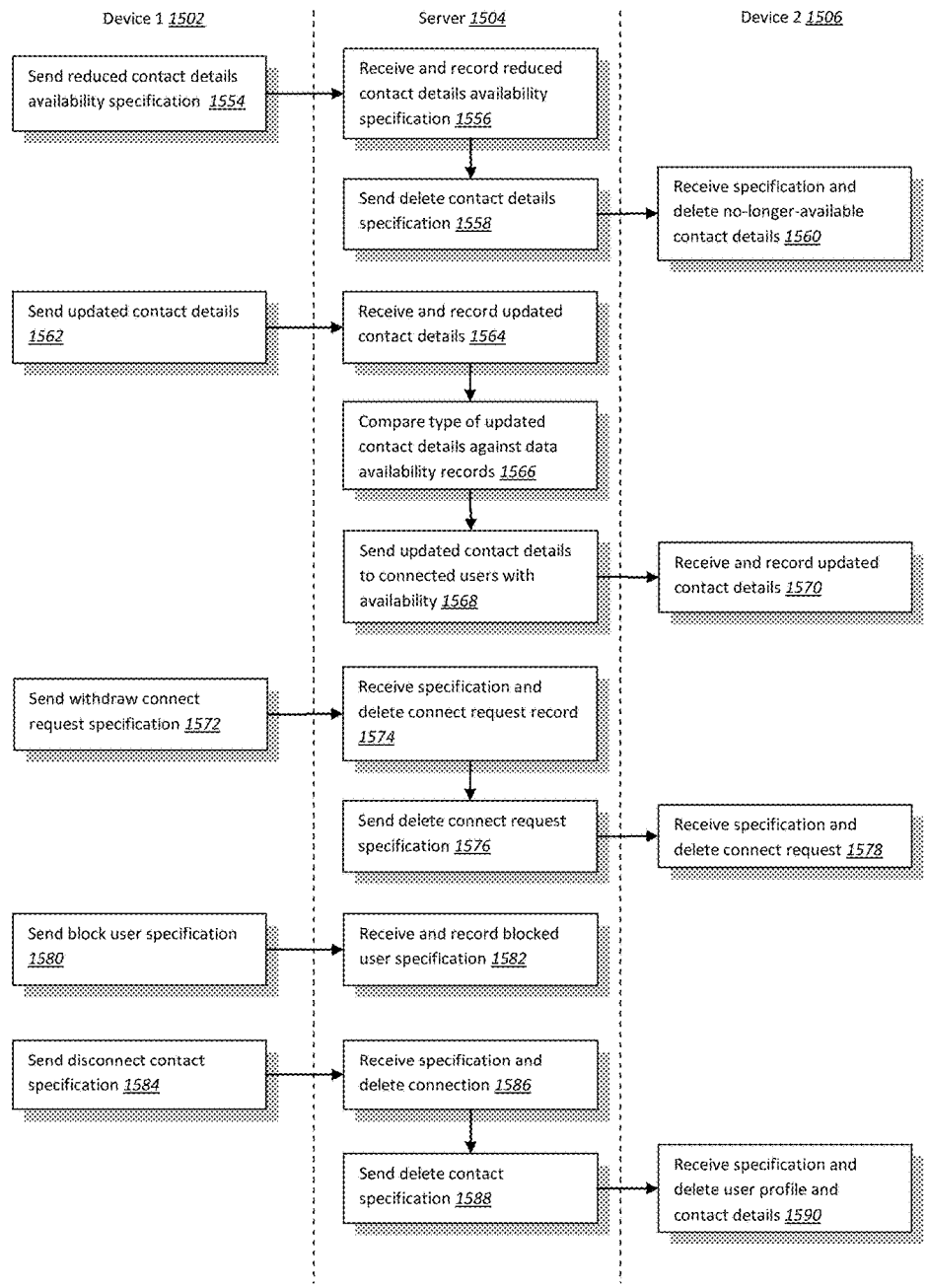
FIGS. 15 A and B collectively are a swim-lane diagram of an example method for providing automated contacts books in accordance with embodiments of the inventive arrangements disclosed herein.

FIGS. 15A and 15B are a swim-lane diagram of an example method or process for providing automated contacts books. For example the process 1500 can be used by a user such as sender's device 102 to connect with and automatically share contact details with a user such as recipient's device 104.

FIGS. 15A and 15B show lanes for steps that can be performed by devices 1502, 1504 and 1506 including a user computing device 1 1502, a contact details server 1504 and a user computing device 2 1506. Each of these steps could be performed by any user of the automated contacts book process in relation to any other user of the process.

Any user device can create an account within the automated contact book system by uploading their unique username, a password, their profile data and their contact details data to the contact details server 1504. In this example, device 1 uploads such data 1508, device 2 uploads such data 1510 and the contact details server receives and records the data and creates accounts for devices 1 and 2 1512. The contact details server can record the username and password within the connections module 216, the profile data within the profiles module 212 and the contact details data within the contact details module 214 of the mass storage device 210.

In the event that a user of the automated contacts book process 1500 wishes to share contact details with another user, he can do this by connecting his account with the other user's account within the contact details server 1504 and specifying which items of his contact details he wishes to share with that other user. In this example. The user of device 1 1502 wishes to share contact details with the user of device 2 1506. Device 1 can send search criteria 1514 relevant to the stored profile data of the user of device 2 to the contact details server 1504. The contact details server 1504 can receive the search criteria and compare them against the stored profile data of all other users 1516. This comparison can be executed within the profiles module 212 of the mass storage device 210. The contact details server 1504 can then send the search results 1518 to device 1. These search results can include the profile details of users that correspond to the search criteria. Device 1 can receive and display the search results 1520. For example, device 1 can display the search results on the display of a mobile or other computing device. The user of device 1 can review the search results and select the profile of the user with whom he wishes to connect and share contact details, in this example the user of device 2. Device 1 can send a connect request 1522 relating to the user of device 2 to the contact details server 1504.

The contact details server can receive a connect request from a user and check whether the user is recorded as a blocked user with regard to the intended recipient of the connect request. In this example, the contact details server 1504 can receive the connect request from device 1 1502 seeking connection with the user of device 2 1506. The contact details server can then compare the connect request against the record of any users specified and recorded as blocked users by the user of device 2 1524. Such blocked user records can be recorded within the connections module 216. In the event that the user of device 1 is not so blocked, the contact details server can record the connect request 1526. The connect request can be recorded within the connections module 216. The contact details server can then send the connect request 1528 to device 2. Device 2 can receive, record and display the connect request 1530. For example, the connect request can be displayed on the display of a mobile or other computing device. The user of device 2 can review the connect request and specify whether it is accepted or rejected, or simply ignore it. Device 2 can send the acceptance or rejection specification to the contact details server 1532. Alternatively, users of the automated contacts book can connect with other users within the contact details server by scanning a matrix barcode displayed, on the screen of the mobile computing device of the other user, or elsewhere, for example on a physical business card. In this example the user of device 1 can cause a matrix barcode to be generated by the automated contacts book application and displayed on the screen of device 1 1536. The user of device 2 can cause device 2 to scan the matrix barcode and device 2 can then automatically send a matrix barcode connect request acceptance to the contact details server 1538.

In the event that a connect request is accepted or a matrix barcode is scanned, this can be recorded within the connections module 216 of the contact details server. In this example, the contact details server 1504 can receive a connect request acceptance, or a matrix barcode connect request acceptance, from device 2 and record the new connection between the users of device 1 and device 2 1534. The new connection can be recorded within the connections module 216. The contact details server can then send the profile details of the user of device 1 to device 2 and the profile details of the user of device 2 to device 1 1540. Device 1 can receive and record the profile data of the user of device 2 1542 and device 2 can receive and record the profile data of the user device 1 1544. Profile data can be recorded within the memory of each device and be available for reference and communication use within the automated contacts book application installed on each device.

Having connected with another user of the automated contacts book, the user may wish to share their contact details with that other user. In this example the user of device 1 1502 wishes to share his contact details with the user of device 2 1506. The user of device 1 can specify, separately or collectively, which of his contact details he would like the contact details server to make available within the automated contacts book of the user of device 2. Device 1 1502 can send the specification of items of contact details to share, or any subsequent additional specification, to the contact details server 1546. The contact details server can receive the specification and record the specification 1548. This can be recorded within the connections module 216. The contact details server 1504 can then send the specified contact details to device 2 1550. Device 2 1506 can receive and record the specified contact details 1552. The contact details can be recorded in the memory of device 2 in association with the profile for the user of device 1 such that they can be available within the automated contacts book application of device 2 for reference and communication use.

In the event that a user of the automated contacts book process 1500, in this example the user of device 1, wishes to reduce the specified contact details available to a connected user, in this example the user of device 2, he can do this by causing device 1 to send a reduced availability specification to the contact details server 1554. The contact details server can receive and record the reduced availability specification 1556. This can be recorded within the connections module 216. The contact details server can send a delete contact details specification to device 2 1558. Device 2 can receive the delete contact details specification and delete the specified contact details for the user of device 1 from the memory of device 2 1560 such that they are no longer in the automated contacts book application of device 2.

In the event that a user of the automated contacts book process 1500, in this example the user of device 1, wishes to update any item of their contact details, such as in this example their personal email address, the user can update that item within the automated contacts book application on device 1. Device 1 can send the updated item of contact details to the contact details server 1562. The contact details server can receive and record the updated item of contact details 1564. This can be recorded within the contact details module 214.

The contact details server can then compare the updated item of contact details against the availability of that item recorded in the connections module 216 for each connected user 1566. The contact details server can then send the updated item, in this example the email address, to the mobile or other computing devices of all users connected to the user of device 1 for whom the personal email address has been specified and recorded as being available, in this example including device 2 1568. Device 2, and other computing devices receiving the updated item, in this example the email address, can receive and record the updated item in the memory of such devices 1570 in association with the profile of the user of device 1 such that the updated item of contact details can be available in the automated contacts book applications of those devices for reference and communication use.

In the event that a connect request of a user of the automated contacts book process 1500, in this example the connect request of the user of device 1 sent to the user of device 2, is ignored by the recipient, the user can specify withdrawal of the connect request. Device 1 can send the withdraw connect request specification to the contact details server 1572. The contact details server can receive the specification and delete the connect request 1574. This can be deleted within the connections module 216. The contact details server can then send a delete connect request specification to device 2 1576. Device 2 can receive the specification and delete the connect request from the memory of device 2 1578 such that it is no longer available within the automated contacts book application on device 2.

In the event that a user of the automated contacts book process 1500, in this example the user of device 1, wishes to block connect requests from another user of the automated contacts book process 1500, in this example the user of device 2, the user can do so by causing device 1 to send a block user specification to the contact details server 1580. The contact details server can receive the specification and record the blocked user 1582. This can be recorded in the connections module 216.

In the event that a user of the automated contacts book process 1500, in this example the user of device 1, wishes to disconnect their account from the account of another user of the automated contacts book process 1500, the user can do so by causing device 1 to send a disconnect specification to the contact details server 1584. The contact details server can receive the specification and delete the connection 1586. This can be deleted within the connections module 216. The contact details server can then send a deletion specification to the device of the disconnected user, in this example device 2 1588. Device 2 can receive the specification and delete the profile and contact details of the user of device 1 from the memory of device 2 1590 such that they are no longer available within the automated contact details application on the device 2.

FIGS. 16 to 19 are a collection of mobile computing device graphical user interfaces (GUIs) illustrating a sample implementation of the automated contacts book in accordance with an embodiment of the inventive arrangements disclosed herein. The GUIs presented in FIGS. 16 to 19 are for illustrative purposes only and additional configurations and functionalities can be incorporated without diverging from this embodiment of the present invention.

In collection 1600, a mobile computing device 1602, such as a smartphone, can provide access to the automated contacts book application via an automated contacts book application icon 1610. The mobile computing device 1602 can include a display area 1604 and an input mechanism 1608, which, in this example, are one-and-the-same. That is, the display area 1604 of a mobile computing device 1602 can also be used as the input mechanism 1608, for example, with a touch screen.

The automated contacts book application icon 1610 can be presented in addition to other program icons 1606, representing other software applications and/or services installed upon the mobile computing device 1602. Selection of the automated contacts book application icon 1610 using the input mechanism 1608 to launch the automated contacts book application can result in displaying the create account page 1612. This page can be the first of the three page set up procedure for the automated contacts book application.

The GUI of the create account page 1612 can allow the user to enter a unique username and password and to view and accept the legal terms and conditions of use of the application. Then, the GUI can allow the user of the mobile computing device 1602 to create an account within the contact details server 114 by clicking the create account button displayed in the GUI of the create account page 1612. Clicking the create account button within the GUI of the create account page 1612 can result in the my profile details page 1618 being displayed.

The GUI of the my profile details 1618 page can allow the user of the mobile computing device 1602 to enter details to be included in his profile within the data fields 1620 such as the user's full name, username and home town. The GUI can also allow the user to upload an identifying photograph. Clicking the save and upload button 1622 within the GUI of the my profile details page 1618 can result in the profile details being sent to the contact details server 114 and recorded within the computer-readable storage medium of the profiles module 212 of the of the mass storage device 210. These profile details can be available for comparison against search criteria submitted by other users. During the initial set up process, clicking the save and upload button 1622 within the GUI of the my profile details page can result in the my contact details page 1624 being displayed.

The GUI within the my contact details page 1624 can allow the user to enter their contact details in the data fields 1628 including for example their email address, mobile telephone number, home address, office email address, office mobile telephone number, office telephone number, office address and fax number. Clicking the save and upload button 1626 within the GUI of the my contact details page 1624 can result in the contact details being sent to the contact details server 114 and recorded within the computer-readable storage medium of the contact details module 214 of the mass storage device 210. These contact details can be available to be sent to the computers or mobile computing devices of connected users.

Figure 17:
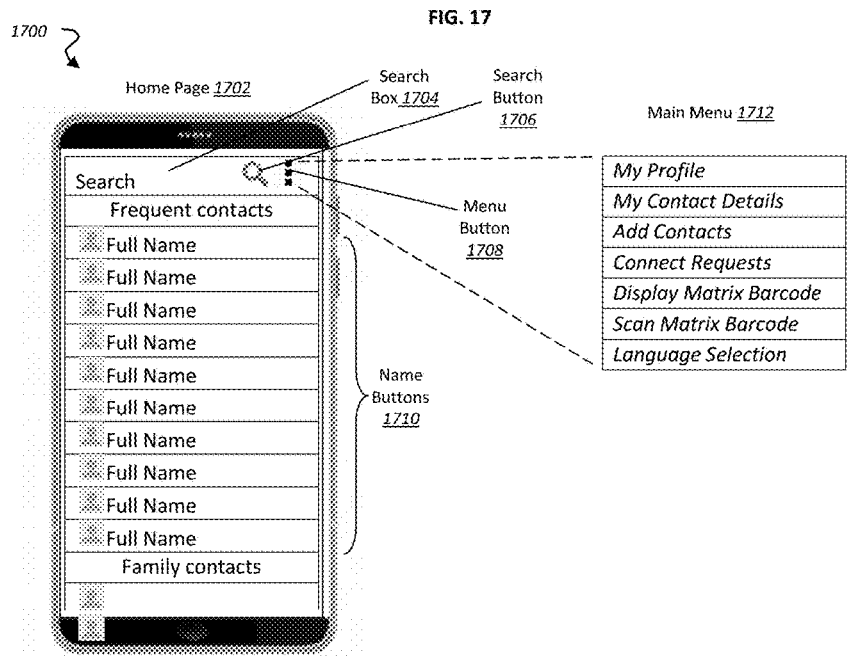
Figure 18:
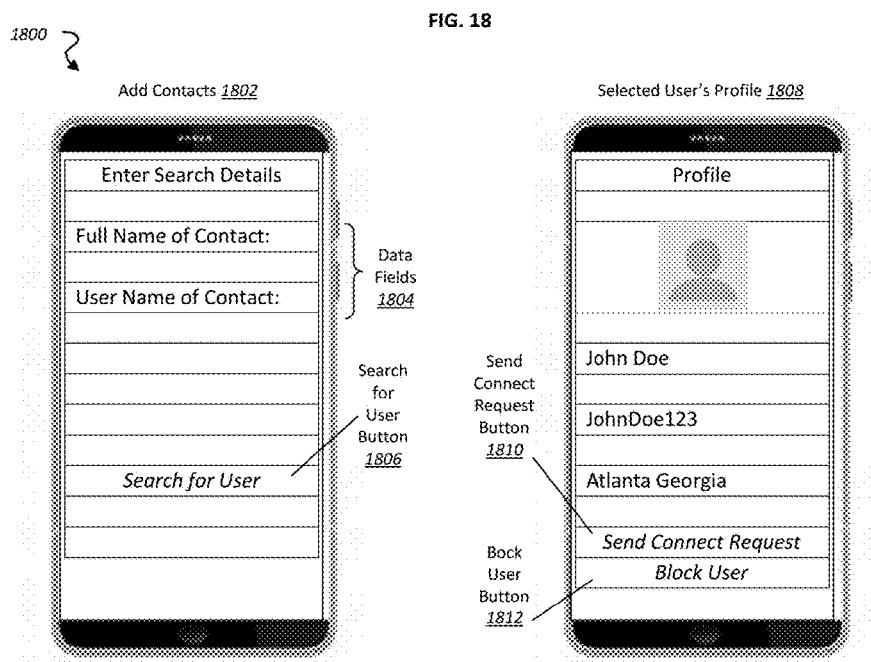
Figure 19:
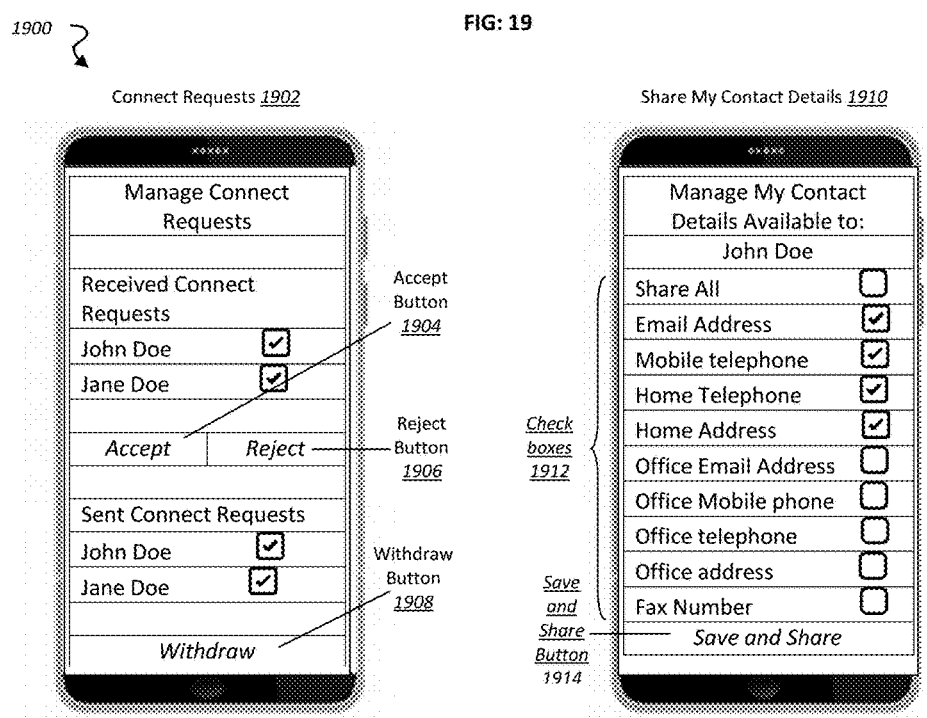

FIG. 17 is a mobile computing device GUI of the home page 1702 of the automated contacts book application in accordance with an embodiment of the inventive arrangements disclosed herein. The GUI of the home page can comprise a search box 1704 and a search button 1706 whereby the user can enter the name of a connected user and retrieve that user's contact details from the computer-readable storage medium of the mobile computing device 1602. The GUI of the home page can also comprise a scrolling alphabetical list of the user's connected users' names and profile photographs. In some implementations, these can be collated in groups including for example, recently contacted users, family members or colleagues. Each connected user's name within the list can operate as a button 1710 which, when clicked, can result in that connected user's contact details page 2002 being displayed.

The GUI within the home page 1702 can also comprise a menu button 1708 which, when clicked, can result in menu options 1712 being displayed. These menu options can include buttons for opening my profile, my contact details, add contacts, connect requests, display matrix barcode, scan matrix barcode and language selection pages. Clicking the my profile button can result in the my profile page 1618 being displayed. Clicking the my contact details button can result in the my contact details page 1624 being displayed. Clicking the connect requests button can result in the connect requests page 1902 being displayed. Clicking the display matrix barcode button can result in a unique user matrix barcode, indicating the username of the user of the device, being displayed. Clicking the scan matrix barcode button can result in the automated contacts book application interfacing with the camera feature of the mobile computing device to cause the camera to scan the matrix barcode. Clicking the language selection button can result in a scrollable language selection list being displayed. From this list the user can select the language in which they wish the interfaces of the automated contacts book application to be displayed on their device.

The GUI within the add contacts page 1802 can allow the user to enter, within the data fields 1804, search criteria relevant to another user with whom the user wishes to connect within the contact details server 114 and share contact details. Search criteria can include the full name and/or the username of the user. Clicking on the search for user button 1806 can result in the search criteria being sent by the mobile computing device to the contact details server 114 and the contact details server comparing the search criteria against the names and usernames of users within the profiles module 212 of the mass storage device 210 of the contact details server 114.

The contact details server 114 can then return the profile details of users matching the search criteria to the mobile computing device and these can be displayed as a scrollable alphabetical list of the full names of those users. Clicking on a name within the scrollable list can result in the selected user's profile 1808 being displayed. The user of the mobile computing device can confirm the identity of the selected user from the displayed profile details and, the user can click the send connect request button 1810. Clicking the send connect request button 1810 can result in the user's mobile computing device sending a connect request to the contact details server 114 and the contact details server comparing the connect request against users who have been specified as blocked users by the intended recipient and recorded as such within the connections module 216 of the mass storage device 210. If the user is not recorded as a blocked user, the contacts details server 114 can send the connect request to the mobile computing device of the recipient and that mobile computing device can record and display the connect request within the connect requests page 1902 of the automated contacts book application of the recipient's mobile computing device.

Users can prevent receipt of undesired connect requests from other users by clicking the block user button 1812 within the GUI of the relevant user's profile. Clicking the block user button within the GUI of a user's profile can result in the mobile computing device sending a block user specification to the contact details server and the contact details server 114 recording this within the connections module 216 of the mass storage device 210. In these circumstances, connect requests from the blocked user will not be sent by the contact details server 114 to the mobile computing device of the blocking user.

Clicking the connect requests button from the menu choices 1712 can result in the connect requests page 1902 being displayed. The GUI within the connect requests page can allow the user to accept or reject received connect requests and to withdraw sent connect requests. Selecting a connect request by checking the associated check box within the GUI and then clicking the accept button 1904, the reject button 1906 or the withdraw button 1908 can result in the mobile computing device sending the acceptance, rejection or withdrawal specification to the contact details server 114. Clicking the accept button can result in the contact details server 114 recording the resulting connection within the connections module 216 of the mass storage device 210. If the connect request is accepted, the contact details server can send the profile details of the accepting user to the mobile computing device of the sending user and the profile details of the sending user to the mobile computing device of the accepting user. The profile details can be recorded in the memory of the receiving devices. Clicking the reject button 1906 or the withdraw button 1908 can result in the connect request being deleted from the connections module 216 of the mass storage device 210 and deleted from the memory of the sender's and receiver's mobile computing devices.

In some implementations, a user may wish to become connected to another user by simply allowing the other user to scan a matrix barcode displayed on their device. This procedure can be used where the two users are in the same location and it avoids the need to search for the other user's profile within the contact details server. Clicking the display matrix barcode button within the main menu 1712 within the GUI of the home page 1702 can result in a matrix barcode being displayed on the screen of the mobile computing device. Clicking the scan matrix barcode button within the main menu choices 1712 within the GUI of the home page 1702 can result in the automated contacts book application interfacing with the camera feature of the scanning mobile computing device and causing the camera to scan the matrix barcode displayed on the screen of the displaying device and then sending a matrix barcode connect request acceptance to the contact details server 114. The contact details server can record the acceptance specification within the connections module 216 of the mass storage device 210 and then send the profile details of the user of the displaying device to the mobile computing device of the scanning user and the profile details of the user of the scanning device to the mobile computing device of the displaying user. The profile details can be recorded in the memory of the receiving devices.

Figure 20:
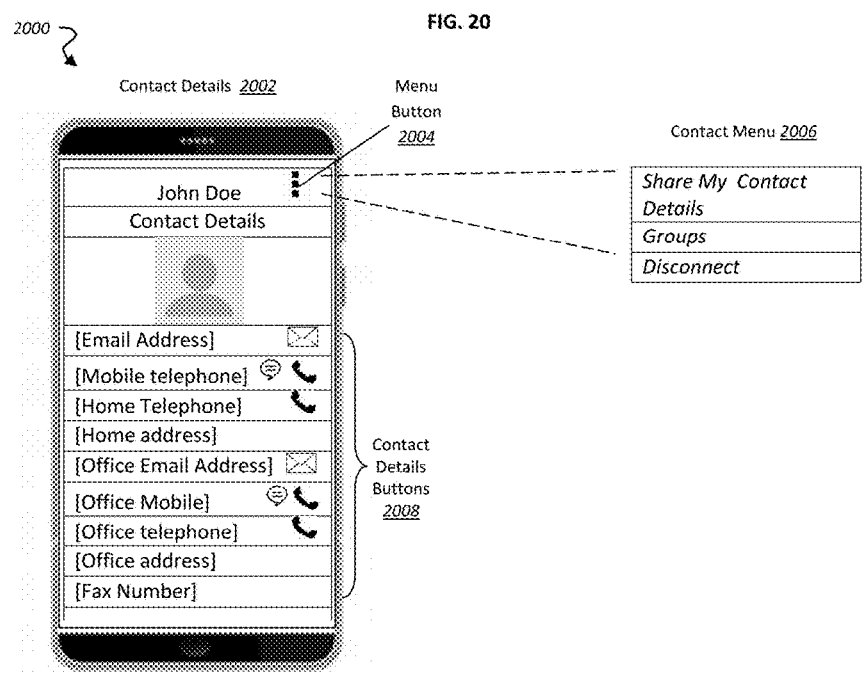

FIG. 20 is a mobile computing device GUI of a user's contact details page 2002 of the automated contacts book application in accordance with an embodiment of the inventive arrangements disclosed herein. Clicking a contact's name within the scrollable list of contact names displayed in the GUI of the home page 1702 can result in that user's contact details page 2002 being displayed. Clicking on the menu button 2004 within the GUI of the user's contact details page 2002 can result in the contact menu choices 2006 being displayed. Clicking on the share my contact details button within the contact menu choices can result in the share my contact details page 1910 being displayed. The GUI of the share my contact details page 1910 can consist of descriptions of each item of the user's contact details, check boxes for each such item and a "share all" check box 1912. Checking the checkbox of an item of contact details can result in that item of contact details being shared with the relevant connected user when the save and share button 1914 is clicked. Checking the "share all" checkbox can result in all items of contact details being shared with the relevant connected user when the save and share button 1914 is clicked. Clicking the save and share button 1914 can result in the mobile computing device sending the specification of contact details to be shared to the contact details server 114 and the contact details server recording this specification within the computer-readable storage medium of the connections module 216 of the mass storage device 210. The contact details server 114 can then send the specified contact details to the mobile computing device of the relevant user. These contact details can be recorded in the memory of the mobile computing device of the relevant user such that they are available within the automated contacts book application for reference and communications use. Similarly, unchecking such a checkbox and clicking the save and share button 1914 can result in the mobile computer device sending a delete contact details specification to the contact details server 114, the contact details server recording the specification within the connections module 216 and sending a delete contact details specification to the relevant connected user's device and that device deleting the specified contact details from the memory of the device such that they are no longer available within the automated contacts book application on that device.

The GUI of a user's contact details page 2002 can consist of the full name and profile photograph of the relevant user and each item of their contact details. The GUI can also comprise buttons representing each item of contact details 2008. Clicking on a button representing an item of contact details can result in the mobile computing device interfacing with the relevant service or application of the mobile computing device to initiate a communication using the corresponding item of contact details. For example, clicking on the button representing the relevant user's email address can result in the mobile computing device launching an email application with a draft email with the relevant user's email address populated in the address field of the draft email. In some implementations, the GUI can also include written descriptions of each item of contact details, for example enabling the user to distinguish between the personal email address and business email address of the relevant user.

Figure 21:
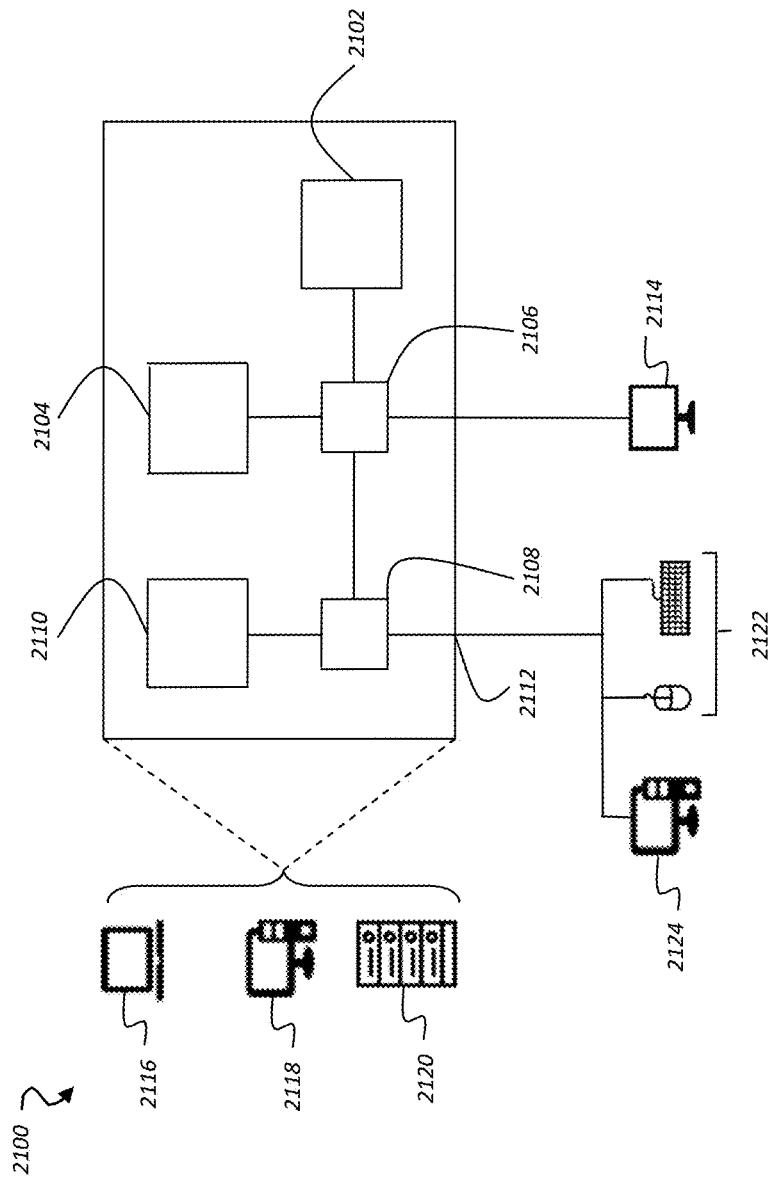
FIG. 21 shows an example of a generic computer device.

FIGS. 21 and 22 illustrate the typical composition of generic computing devices. FIG. 21 represents a typical non-mobile computing device 2100 and FIG. 22 represents a typical mobile computing device 2200. These devices can be used to carry out the procedures set out herein including those to be performed on a server and those to be performed on a computer or mobile-computing device. In each case, the arrangement and connection of the components within the computing devices are illustrative of one implementation of each such device. In other implementations the components may be arranged and connected differently and further components may be connected. These illustrations are not intended to be definitive.

The computing device 2100 is illustrative of several types of computing device. These include desktop personal computers and laptop personal computers 2116, different types of servers including a standard server 2118, stacked servers 2120 as well as other computing devices.

The computing device 2100 comprises the following principal components which are connected to each other by a plurality of buses and may be sited on the same motherboard: processor 2102, memory 2104, a north bridge 2106 and south bridge 2108, a mass storage device 2110, an external interface 2112, a display 2114 and human input devices 2122 and can be connected, via networking devices, to other computing devices 2124.

The processor 2102 can be connected via the north bridge 2106 to the memory 2104 and the display 2114 and to the south bridge 2108 and, via the south bridge, 2108 to the mass storage device 2110 and the communications devices. The processor 2102 can execute instructions for the processes to be carried out within the computing device. Such instructions can be stored in the mass storage device 2110 or in the memory 2104. The output from the processor 2102 can be represented on a display 2114, connected to the processor 2102 via the north bridge 2106, in the form of a graphical user interface.

Generally, the north bridge 2106 can connect the processor 2102 to the components of the computing device that perform high speed data functions such as the memory 2104 and display 2114 on which the graphical user interface is represented. Generally, the south bridge 2108 can connect the processor 2102 to the components of the computing device that perform lower speed data functions such as the mass storage device 2110 and, via the low speed expansion port 2112, to peripheral devices for human input such as the keyboard and pointer 2122 and other peripherals such as printers, scanners or cameras. Networking devices such as routers and wireless connection devices such as radio frequency transceivers can also be connected to the low-speed expansion port 2112 and, via the south bridge 2106, to the processor 2102.

The memory 2104 can be an information carrier that can store information and instructions within the computing device 2100. The memory 2104 component of the computing device may be a computer-readable medium such as dynamic random access memory or static random access memory or non-volatile memory, or it may be another type of computer-readable medium.

The mass storage device 2110 can be an information carrier that can provide mass storage of information and instructions within the computing device 2100. The mass storage device 2110 can be a computer-readable medium including non-volatile memory components such as solid state memory, optical disc, tape device, hard disk or floppy disk. The mass storage may be provided entirely by one mass storage device or by a plurality of separate but connected mass storage devices.

The implementation of the computing device 2100 may take the form of a personal computer such as a laptop or desktop computer or of a server or series of connected servers. The computing device as illustrated may be combined with components of the mobile computing device 2200 as a system or network.

The computing device 2200 is illustrative of several types of mobile computing devices. These include but are not limited to cellular telephones, smartphones, mobile tablet computers and other mobile personal computing devices.

The computing device 2200 comprises the following components which are connected to each other by a plurality of buses and may be sited on the same motherboard: processor 2202, memory 2204, communication interface 2206, external interface 2208, radio frequency transceiver 2210, control interface 2212, display interface 2214, input and output display 2216, audio codec 2218 and system identification module 2220 (SIM card).

Instructions for the processes to be carried out within the mobile computing device 2200 can be stored in the memory 2204 and can be carried out by the processor 2202. The processor 2202 can take the form of a chipset of chips or system on a chip. In this implementation, the chipset may include a plurality of processor chips and may provide for coordination of the other components of the computing device, including the memory 2204, the control interface 2212 and input output display 2216 and wireless communication components including radio frequency transceiver 2210.

The output from the processor 2202 can be displayed, via a display interface 2214, and represented in the form of a graphical user interface, on a device such as a touch screen display 2216 connected to the processor 2202 via a control interface 2212. The display interface 2214 can comprise circuits which function so as to drive the display 2216 and enable communication with the user. The control interface 2212 can comprise circuits which function so as to receive input from the display 2216 and convert it for submission to the processor 2202. The processor 2202 may be connected to an external interface 2208 to provide for near area communication with other devices. Such communication could be wireless and/or wired communication.

The memory 2204 can consist of one or more memory units and can comprise both volatile and non-volatile memory. The memory 2204 may consist of flash memory and/or non-volatile random access memory. The memory 2204 can store information and instructions within the mobile computing device.

The system identification module 2220 (SIM card) may be connected to the communication interface 2206 and can carry important information such as the cellular telephone number, the carrier supplying service, subscription details and security information. The SIM card 2220 can serve primarily to identify the mobile computing device on a radio network. The SIM card 2220 may also contain a memory for storing personal telephone number registry, SMS messages and user specific mobile terminal settings.

Wireless communication by device 2200 may be carried out by radio frequency transceiver 2210 operating via communication interface 2206. A number of different communication protocols may be used for this purpose including but not limited to GSM, GPRS, 3G or 4G.

The computing device 2200 may interact with the user via a display 2216 which may comprise a LCD or AMOLED or similar technology. Such display 2216 may provide information to the user and information from the user to the computing device.

Audio codec 2218 can operate so as to code or decode audible sound received from a microphone or to be transmitted to a speaker thereby enabling device 2200 to communicate audibly with the user. For example such communication may include telephone calls, or playback of recorded sound files.

Computer program code for carrying out operations for aspects of the present invention may be written in any combination of one or more programming languages, including but not limited to an object oriented programming language such as Objective C, Java, Smalltalk, C++ or the like and conventional procedural programming languages, such as the "C" programming language or similar programming languages.

As will be appreciated by one skilled in the art, aspects of the present invention may be embodied as a system, method or computer program product. The computer program product may contain instructions which, when executed, perform one or more methods, such as those described above. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The system and method described herein may be implemented by computer software, firmware, computer hardware, digital electronic circuitry, integrated circuitry, application specific integrated circuits or combinations thereof. Such implementations can include a computing system comprising a data server, an application server and one or more client computers with a graphical user interface through which the user(s) can interact with the system described herein. A computing device, including a server, may be any system including at least one programmable processor which may be general purpose or special purpose, connected to receive instructions and information from and transmit instructions and information to a storage system and at least one input device and at least one output device.

The computer program code may execute entirely on one or more remote computers or servers or partly on the user's computer and partly on the one or more remote computers or servers. In some implementations of the inventive processes described herein, the instructions for such processes may be carried out entirely by the processor of one computing device, which may be special or general purpose. In other implementations, such instructions may be carried out by partly by the processors of each of more than one connected computing devices. In yet other implementations, such instructions may be carried out entirely by the processor of a remote computing device or server. In these implementations, the instructions may be stored entirely in the memory or mass storage device of one of the computing devices or partly in the memories or mass storage devices of each of more than one computing devices.

In the latter scenarios, the remote computing devices may be connected to the user's computing device through any type of network, including a local area network or a wide area network, or the connection may be made to an external computer, for example, through the internet using an internet service provider.

Furthermore, aspects of the present invention may take the form of a computer program product physically embodied in an information carrier such as one or more computer-readable medium(s) having computer-readable program code embodied thereon. Such computer-readable mediums can be the memory 2104, the mass storage device 2110, or memory on processor 2102, the memory 2204 or the memory on processor 2202. The computer-readable mediums may also be a propagated data signal with computer-readable program code embodied therein. Such a signal could take the form of an electromagnetic, optical or other signal that can propagate, communicate or transport a program that may be received, for example, by the low-speed expansion port 2112 or radio frequency transceiver 2210 for use by or in connection with an instruction execution system, apparatus, or device.

Program code embodied on a computer-readable medium may be transmitted using any appropriate medium, including but not limited to wireless, wireline, optical fibre cable, radio frequency, etc., or any suitable combination thereof.

The flowchart and block diagrams in the figures illustrate the architecture, functionality, and operation of possible implementations of systems, methods and computer program products according to various embodiments of the present invention.

Each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Elements may be left out of the flowchart or block diagrams without adversely affecting their operation.

Parts of some implementations described herein may be combined to form other implementations not described herein. Various modifications may be made without departing from the spirit and scope of the invention.

It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A computer-implemented method for the provision of automated contacts books comprising:
    receiving and recording at a computer system profile data and contact details data for a plurality of users;
    providing within the computer system access to profile data for user search requests and providing search results;
    establishing within the computer system connections between users based on connection requests and acceptances transmitted and received by users within the computer system;
    receiving and recording at the computer system indications of user contact details data sharing specifications and automatically sharing users' contact details data with connected users based on those specifications; and
    receiving and recording at the computer system updated contact details data and automatically updating previously shared contact details data to reflect the updated contact details;
    wherein the computer-implemented method for establishing connections comprises:
    providing by the computer system access to the recorded profile data via a search user interface and providing search results via a search results and selection user interface;
    receiving at the computer system an indication that a user wishes to connect within the computer system with another user selected from the search results;
    automatically providing by the computer system to the other user a request to accept connection with the user within the computer system;
    receiving at the computer system acceptance of the connection request; and
    recording the resulting connection within a connections module of the database of the computer system.

2. A computer-implemented method for the provision of automated contacts books comprising:
    receiving and recording at a computer system profile data and contact details data for a plurality of users;
    providing within the computer system access to the profile data for user search requests and providing search results;
    establishing within the computer system connections between users based on connection requests and acceptances transmitted and received by users within the computer system;
    receiving and recording at the computer system indications of user contact details data sharing specifications and automatically sharing users' contact details data with connected users based on those specifications; and
    receiving and recording at the computer system updated contact details data and automatically updating previously shared contact details data to reflect the updated contact details;
    wherein the computer-implemented method for establishing connections comprises:
    the computer system including at least one remote server and a plurality of mobile computing devices each associated with a particular user within the computer system;
    displaying by a mobile computing device a unique identifier associated with the user within the computer system;
    scanning of the unique identifier by the mobile computing device associated with a second user within the computer system;
    receiving at the computer system an indication that display and scanning of the unique identifier has occurred; and
    recording the resulting connection within a connections module of a database of the computer system.

3. A computer-implemented method for the provision of automated contacts books comprising:
    receiving and recording at a computer system profile data and contact details data for a plurality of users;
    providing within the computer system access to the profile data for user search requests and providing search results;
    establishing within the computer system connections between users based on connection requests and acceptances transmitted and received by users within the computer system;
    receiving and recording at the computer system indications of user contact details data sharing specifications and automatically sharing users' contact details data with connected users based on those specifications; and
    receiving and recording at the computer system updated contact details data and automatically updating previously shared contact details data to reflect the updated contact details;
    wherein the computer-implemented method for the updating of shared contact details comprises:
    providing by a computer system a user interface for the input of user contact details data into the computer system;
    receiving at the computer system updated contact details data for a user and recording the updated contact details data within a contact details module of a database within the computer system; and providing to users, connected with the user within the computer system and in relation to which the contact details have been specified for sharing, the updated contact details in a user interface by immediately and automatically pushing the updated contact details to their device.

4. The computer system for the provision of automated contacts books comprising memory having computer readable instructions and one or more processors configured to execute the computer-readable instructions to perform operations including:

receiving and recording at the computer system profile data and contact details data for a plurality of users;

providing within the computer system access to the profile data for user search requests and providing search results;

establishing within the computer system connections between users based on connection requests and acceptances transmitted and received by users within the computer system;

receiving and recording at the computer system indications of user contact details data sharing specifications and automatically sharing users' contact details data with connected users based on those specifications; and receiving and recording at the computer system updated contact details data and automatically updating previously shared contact details data to reflect the updated contact details;

wherein the computer system for establishing connections comprises memory having computer readable instructions and one or more processors configured to execute the computer-readable instructions to perform operations including:

providing by the computer system access to the recorded profile data via a search user interface and providing search results via a search results and selection user interface;

receiving at the computer system an indication that a user wishes to connect within the computer system with another user selected from the search results;

automatically providing by the computer system to the other user a request to accept connection with the user within the computer system;

receiving at the computer system acceptance of the connection request; and recording the resulting connection within a connections module of a database of the computer system.

5. A computer system for the provision of wherein the automated contacts books comprising memory having computer-readable instructions and one or more processors configured to execute the computer-readable instructions to perform operations including:

receiving and recording at the computer system profile data and contact details data for a plurality of users;

providing within the computer system access to the profile data for user search requests and providing search results;

establishing within the computer system connections between users based on connection requests and acceptances transmitted and received by users within the computer system;

receiving and recording at the computer system indications of user contact details data sharing specifications and automatically sharing users' contact details data with connected users based on those specifications; and receiving and recording at the computer system updated contact details data and automatically updating previously shared contact details data to reflect the updated contact details; and wherein the computer system for establishing connections includes at least one remote server and a plurality of mobile computing devices each associated with a particular user and comprises memory having computer-readable instructions and one or more processors configured to execute the computer-readable instructions to perform operations including:

displaying by a mobile computing device a unique identifier associated with the user within the computer system;

scanning of the unique identifier by the mobile computing device associated with a second user within the computer system;

receiving at the computer system an indication that display and scanning of the unique identifier has occurred; and recording the resulting connection within a connections module of a database of the computer system.

6. A computer system for the provision of automated contacts books comprising memory having computer-readable instructions and one or more processors configured to execute the computer-readable instructions to perform operations including:

receiving and recording at the computer system profile data and contact details data for a plurality of users;

providing within the computer system access to the profile data for user search requests and providing search results;

establishing within the computer system connections between users based on connection requests and acceptances transmitted and received by users within the computer system;

receiving and recording at the computer system indications of user contact details data sharing specifications and automatically sharing users' contact details data with connected users based on those specifications; and receiving and recording at the computer system updated contact details data and automatically updating previously shared contact details data to reflect the updated contact details;

wherein the computer system for the updating of shared contact details comprises memory having computer-readable instructions and one or more processors configured to execute the computer-readable instructions to perform operations including:

providing by the computer system a user interface for the input of user contact details data into the computer system;

receiving at the computer system updated contact details data for a user and recording the updated contact details data within a contact details module of a database within the computer system; and providing to users, connected with the user within the computer system and in relation to which the contact details have been specified for sharing, the updated contact details in a user interface by immediately and automatically pushing the updated contact details to their device.

7. A computer program product for the provision of automated contacts books, the computer program product comprising one or more non-transitory computer-readable storage medium(s) comprising:

computer-usable program code configured to receive and record at a computer system profile data and contact details data for a plurality of users;

computer-usable program code configured to provide within the computer system access to the profile data for user search requests and to provide search results;

computer-usable program code configured to establish within the computer system connections between users based on connection requests and acceptances sent and received by users within the computer system;

computer-usable program code configured to receive and record at the computer system indications of user contact details data sharing specifications and to automatically share users' contact details data with connected users based on those specifications; and computer-usable program code configured to receive and record at the computer system updated contact details data and to automatically update previously shared contact details data to reflect the updated contact details;

wherein the computer-useable program code configured to establish connections comprises:

computer-usable program code configured to provide at a computer system access to the recorded profile data via a search user interface and to provide search results via a search results and selection user interface;

computer-usable program code configured to receive at the computer system an indication that a user wishes to connect within the computer system with another user selected from the search results;

computer-usable program code configured to automatically provide to the other user a request to accept connection with the user within the computer system;

computer-usable program code configured to receive at the computer system acceptance of the connection request; and computer-usable program code configured to record the resulting connection within a connections module of the database of the computer system.

8. A computer program product for the provision of automated contacts books, the computer program product comprising one or more non-transitory computer-readable storage medium(s) wherein the computer-useable program code embodied therewith comprises:

computer-usable program code configured to receive and record at a computer system profile data and contact details data for a plurality of users;

computer-usable program code configured to provide within the computer system access to the profile data for user search requests and to provide search results;

computer-usable program code configured to establish within the computer system connections between users based on connection requests and acceptances sent and received by users within the computer system;

computer-usable program code configured to receive and record at the computer system indications of user contact details data sharing specifications and to automatically share users' contact details data with connected users based on those specifications; and computer-usable program code configured to receive and record at the computer system updated contact details data and to automatically update previously shared contact details data to reflect the updated contact details;

wherein the computer-useable program code configured to update shared contact details data comprises:

computer-usable program code configured to provide at a computer system a user interface for the input of user contact details data into the computer system;

computer-usable program code configured to receive at the computer system updated contact details data for a user and to record the updated contact details data within a contact details module of a database within the computer system; and computer-usable program code configured to provide to users, connected with the user within the computer system and in relation to which the contact details have been specified for sharing, the updated contact details in a user interface by immediately and automatically pushing the updated contact details to their device.

9. A computer program product for the provision of automated contacts books, the computer program product comprising one or more non-transitory computer-readable storage medium(s) wherein the computer-useable program code embodied therewith comprises:

computer-usable program code configured to receive and record at a computer system profile data and contact details data for a plurality of users;

computer-usable program code configured to provide within the computer system access to the profile data for user search requests and to provide search results;

computer-usable program code configured to establish within the computer system connections between users based on connection requests and acceptances sent and received by users within the computer system;

computer-usable program code configured to receive and record at the computer system indications of user contact details data sharing specifications and to automatically share users' contact details data with connected users based on those specifications; and computer-usable program code configured to receive and record at the computer system updated contact details data and to automatically update previously shared contact details data to reflect the updated contact details;

wherein the computer-useable program code configured to establish connections comprises:

computer-usable program code configured to display on a mobile computing device associated with a particular user within the computer system a unique identifier associated with the user within the computer system;

computer-usable program code configured to scan the unique identifier by the mobile computing device associated with a second user within the computer system;

computer-usable program code configured to receive at the computer system an indication that display and scanning of the unique identifier has occurred; and computer-usable program code configured to record the resulting connection within a connections module of the database of the computer system.

* * * * *